(12) United States Patent
Diem et al.

(10) Patent No.: US 12,498,783 B1
(45) Date of Patent: Dec. 16, 2025

(54) HAND CHIRALITY ESTIMATION FOR EXTENDED REALITY TRACKING

(71) Applicant: Snap Inc., Santa Monica, CA (US)

(72) Inventors: Markus Diem, Vienna (AT); Thomas Muttenthaler, Vienna (AT); Daniel Wolf, Mödling (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/741,145

(22) Filed: Jun. 12, 2024

(51) Int. Cl.
  *G06F 3/01*     (2006.01)
  *G02B 27/01*    (2006.01)
  *G06T 19/00*    (2011.01)

(52) U.S. Cl.
  CPC ............ *G06F 3/011* (2013.01); *G02B 27/017* (2013.01); *G06T 19/006* (2013.01)

(58) Field of Classification Search
  CPC ...... G06F 3/011; G02B 27/017; G06T 19/006
  See application file for complete search history.

(56) References Cited

U.S. PATENT DOCUMENTS

| | | |
|---|---|---|
| 7,971,156 B2 | 6/2011 | Albertson et al. |
| 9,225,897 B1 | 12/2015 | Sehn et al. |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |

(Continued)

FOREIGN PATENT DOCUMENTS

| | | |
|---|---|---|
| EP | 3707693 | 9/2020 |
| EP | 4172726 | 5/2023 |

(Continued)

OTHER PUBLICATIONS

Turner, Moses, "Monado's hand tracking: hand-waving our way towards a first attempt", Collabora, [Online]. Retrieved from the Internet: <URL: https://www.collabora.com/news-and-blog/blog/2022/05/31/monado-hand-tracking-hand-waving-our-way-towards-a-first-attempt/>, (May 31, 2022), 8 pgs.

(Continued)

*Primary Examiner* — Robert J Michaud
(74) *Attorney, Agent, or Firm* — Schwegman Lundberg & Woessner, P.A.

(57) ABSTRACT

Examples in the present disclosure relate to hand chirality estimation. Tracking data captured by one or more sensors associated with an extended reality (XR) device is processed to determine positions of a plurality of joints of a hand of a person. A reference vector is generated based on a first subset of the positions. The first subset of the positions includes positions of at least two metacarpophalangeal joints. A plurality of bending angles is determined based on at least a second subset of the positions. Each bending angle represents an angle between a respective pair of articulating bones that is measured in relation to the reference vector. An estimated chirality of the hand is identified based on the plurality of bending angles. Operation of the XR device is controlled using the estimated chirality of the hand.

20 Claims, 10 Drawing Sheets

(56) References Cited

U.S. PATENT DOCUMENTS

| | | | |
|---|---|---|---|
| 10,591,730 | B2 | 3/2020 | Rodriguez, II et al. |
| 10,614,855 | B2 | 4/2020 | Huang |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,531,402 | B1 | 12/2022 | Stolzenberg |
| 11,546,505 | B2 | 1/2023 | Canberk |
| 2016/0086349 | A1* | 3/2016 | Shotton ............... G06T 7/75 382/103 |
| 2019/0146219 | A1 | 5/2019 | Rodriguez, II |
| 2021/0011612 | A1 | 1/2021 | Dancie et al. |
| 2021/0074016 | A1 | 3/2021 | Li et al. |
| 2021/0166732 | A1 | 6/2021 | Shaburova et al. |
| 2021/0174034 | A1 | 6/2021 | Retek et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0397000 | A1 | 12/2021 | Rodriguez, II |
| 2021/0405761 | A1 | 12/2021 | Canberk |
| 2022/0051145 | A1* | 2/2022 | Zhang ............... G06N 20/10 |
| 2022/0100265 | A1 | 3/2022 | Kies et al. |
| 2022/0188539 | A1 | 6/2022 | Chan et al. |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |
| 2022/0301231 | A1 | 9/2022 | Eirinberg et al. |
| 2022/0326781 | A1 | 10/2022 | Hwang et al. |
| 2022/0334649 | A1 | 10/2022 | Hwang et al. |
| 2022/0375174 | A1 | 11/2022 | Arya et al. |

FOREIGN PATENT DOCUMENTS

| | | |
|---|---|---|
| EP | 4172730 | 5/2023 |
| KR | 20220158824 | 12/2022 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

OTHER PUBLICATIONS

"International Application Serial No. PCT/US2025/033114, International Search Report mailed Sep. 19, 2025", 4 pgs.

"International Application Serial No. PCT/US2025/033114, Written Opinion mailed Sep. 19, 2025", 7 pgs.

Fan, Zhang, et al., "MediaPipe Hands: On-device Real-time Hand Tracking", Arxiv.Org, Cornell University Library, 201 Olin Library Cornell University Ithaca, NY 14853, (Jun. 18, 2020), 5 pgs.

Wang, Yu, et al., "Enlarging the Usable Hand Tracking Area by Using Multiple Leap Motion Controllers in VR", IEEE Sensors Journal, vol. 21, No. 16, (May 25, 2021), 15 pgs.

* cited by examiner

HAND CHIRALITY ESTIMATION FOR EXTENDED REALITY TRACKING

TECHNICAL FIELD

Subject matter in the present disclosure relates, generally, to extended reality (XR) devices. More specifically, but not exclusively, the subject matter relates to hand chirality estimation for motion tracking performed by an XR device.

BACKGROUND

Many XR devices include tracking systems. For example, a tracking system of an XR device processes images captured by one or more cameras of the XR device to determine positions of landmarks or other visual features in a scene. This enables the XR device to track an object, such as a hand of a user, within a field of view of the XR device.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
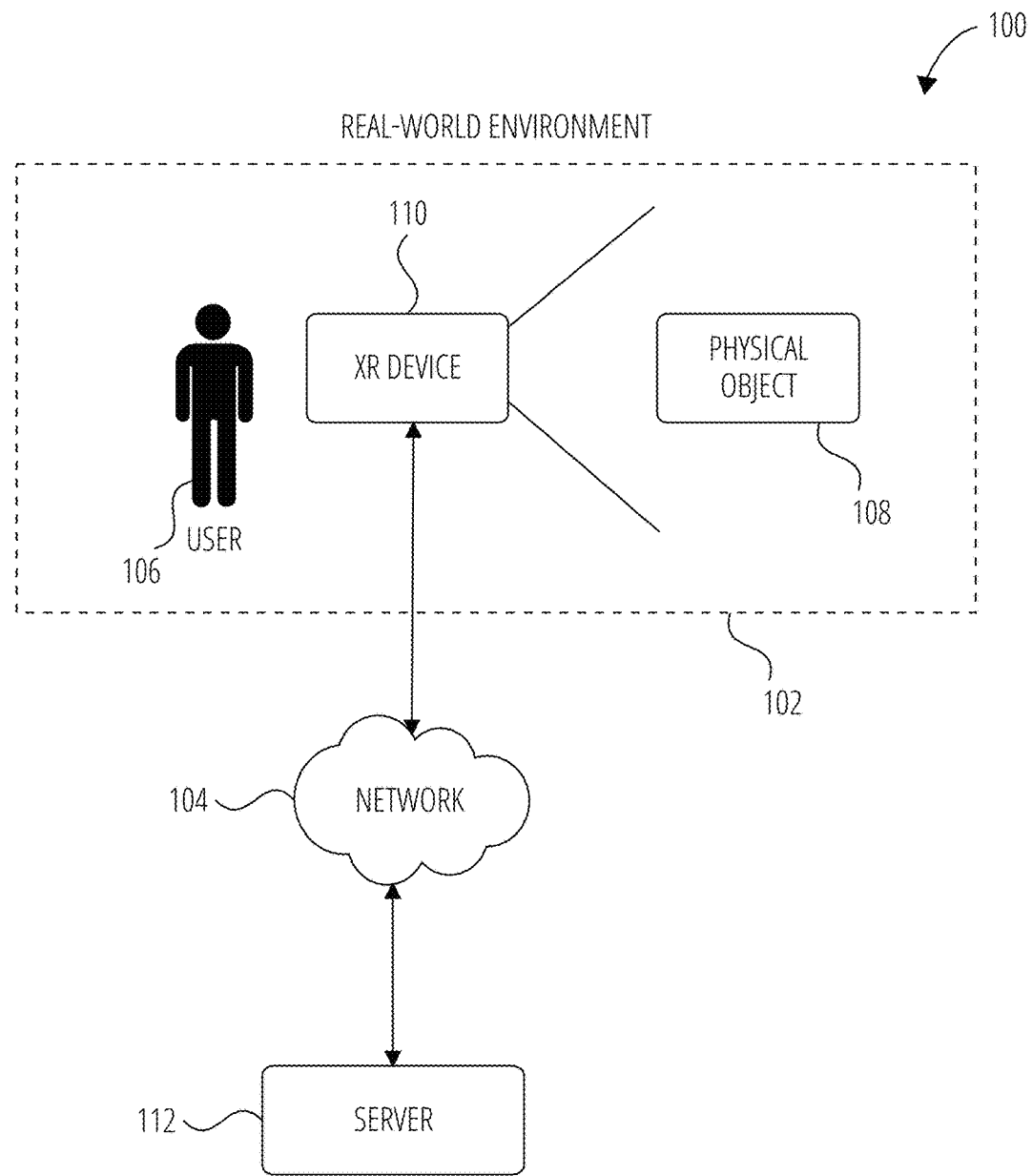
FIG. 1 is a block diagram illustrating a network environment for operating an XR device, according to some examples.

The description that follows describes systems, devices, methods, techniques, instruction sequences, or computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Many XR devices perform object tracking. For example, objects in the real world are tracked to provide realistic, entertaining, or useful XR experiences, for example, by displaying virtual content based on the position or movements of a tracked object. Some XR devices use hand gestures as an input. This enables a user to interact with an XR device without a traditional input device, such as a touchpad or controller, but typically requires swift and accurate detection and tracking of the hand.

In some cases, it is useful or even necessary for an XR device to identify or estimate the chirality of a hand of the user. In the context of the present disclosure, the "chirality" of a hand may include an indication of whether the hand is a left hand or a right hand. For example, knowing that a hand appearing in the field of view of the XR device is a right hand (or is likely to be a right hand) can facilitate the tracking thereof across a sequence of image frames, or it can facilitate the correct detection of a gesture performed by the hand (e.g., a grab gesture, a drag gesture, or a pinch gesture performed by the user to trigger a particular response from the XR device).

In some examples, chirality provides an indication of whether the left hand or the right hand is the dominant (or primary) hand. In other words, in some examples, the chirality of the hand refers to a user's handedness. This information can be used by the XR device to select, adjust, or optimize a user's experience. For example, upon detecting that the user primarily uses their left hand for selections or has raised their left hand in response to a request to raise their dominant hand, the XR device can automatically generate user interfaces, buttons, icons, or other mechanisms to suit the dominant hand of the user.

However, the identification or estimation of hand chirality by an XR device presents technical challenges. Machine learning models can be trained to predict or infer, based on one or more input images, the chirality of a hand appearing in the images. However, since a hand includes many joints and articulating bones that move relative to each other, it can appear in various positions or angles in the images captured by an XR device, making such machine learning models potentially error-prone or insufficiently robust. Machine learning model training and inference can also be computationally expensive. Furthermore, depending on the implementation, inference associated with chirality estimation can introduce unacceptable latency into an XR experience, making it less smooth or engaging.

Examples described herein address technical challenges by providing a reliable, robust, and/or computationally efficient XR device-implemented technique for chirality estimation. In some examples, the XR device processes tracking data to determine multiple bending angles associated with a hand of a user, and then processes the bending angles (e.g., without the use of a machine learning model) to estimate the chirality of the hand.

XR devices can include augmented reality (AR) devices or virtual reality (VR) devices. "Augmented reality" (AR) can include an interactive experience of a real-world environment where physical objects or environments that reside in the real world are "augmented" or enhanced by computer-generated digital content (also referred to as virtual content or synthetic content). AR can also refer to a system that enables a combination of real and virtual worlds (e.g., mixed reality), real-time interaction, or three-dimensional (3D) registration of virtual and real objects. In some examples, a user of an AR system can perceive or interact with virtual content that appears to be overlaid on or attached to a real-world physical object. The term "AR application" is used herein to refer to a computer-operated application that enables an AR experience.

"Virtual reality" (VR) can include a simulation experience of a virtual world environment that is distinct from the real-world environment. Computer-generated digital content is displayed in the virtual world environment. VR can refer to a system that enables a user of a VR system to be completely immersed in the virtual world environment and to interact with virtual objects presented in the virtual world environment. While examples described in the present disclosure focus primarily on XR devices that provide an AR experience, it will be appreciated that one or more aspects of the present disclosure may also be applied to VR.

A "user session" is used herein to refer to an operation of an application during periods of time. For example, a user session refers to an operation of an AR application executing on a head-wearable XR device between the time the user puts on the XR device and the time the user takes off the head-wearable device. In some examples, the user session starts when the XR device is turned on or is woken up from sleep mode and stops when the XR device is turned off or placed in sleep mode. In another example, the session starts when the user runs or starts an AR application, or runs or starts a particular feature of the AR application, and stops when the user ends the AR application or stops the particular features of the AR application.

An example method includes processing tracking data captured by one or more sensors associated with an XR device to determine positions of a plurality of joints of a hand of a person. As used herein, "tracking data" may include data captured by one or more sensors that describe (or can be processed to describe) the movement, position, orientation, or other kinematic properties of an object or body part, such as a human hand. Tracking data may be captured by various sensors, such as optical (e.g., cameras), inertial (e.g., trackers attached to the hand), or depth sensors to enable chirality estimation and tracking movements of a user's hand in real-time. Tracking data can be processed to determine positions of joints and orientations of bones or other segments of a hand. In some examples, tracking data includes, or is processed to provide, the positions of joints. These positions may be provided as landmarks, such as 3D coordinates of respective joints. In some examples, the XR device executes a landmark detection machine learning model to obtain, from tracking data, the joint positions (e.g., respective sets of 3D coordinates with their associated joint identifiers).

The XR device is, in some examples, a head-wearable device. The hand of the person can be the hand of a user of the XR device or the hand of another person tracked (or to be tracked) by the XR device.

Various joint positions can be analyzed as part of techniques described herein. In some examples, the XR device only processes joint positions related to a subset of the fingers, such as the joints of an index finger of the hand and joints of a middle finger of the hand. In some examples, the plurality of joints referred to above specifically excludes joints of a thumb of the hand.

In some examples, the method includes generating a reference vector based on a first subset of the positions of the joints. In some examples, the reference vector is a line in 3D space that is generated by fitting the line to the first subset of the positions of the joints. A direction of the reference vector can be set based on a predetermined setting (e.g., starting at one particular joint and extending through one or more other particular joints).

For example, the reference vector is generated using at least two metacarpophalangeal (MCP) joints from among the plurality of joints, such as at least two of an index finger MCP joint, a middle finger MCP joint, a ring finger MCP joint, or a pinky finger MCP joint. In some examples, the reference vector is generated based on the positions of at least the index finger MCP joint and the middle finger MCP joint as determined from the tracking data.

The example method further includes determining a plurality of bending angles based on at least a second subset of the positions of the joints. The first subset of the positions and the second subset of the positions can overlap, in some examples. A "bending angle," as used herein, may include an angle formed between two finger segments, such as the angle between a respective pair of articulating bones of the hand. In some examples, each bending angle is computed or expressed by the XR device in relation to the reference vector (e.g., the angle between a pair of adjacent bones, considered around the reference vector).

The bending angles are utilized by the XR device to identify an estimated chirality of the hand. In some examples, each of the plurality of bending angles indicates whether a respective segment of the hand (e.g., finger or part thereof) is estimated to be bent in a positive direction or in a negative direction in relation to the reference vector.

For example, the XR device determines an aggregated value representing the plurality of bending angles by computing at least one of an average of the plurality of bending angles, a median of the plurality of bending angles, or a sum of the plurality of bending angles, and uses the aggregated value to identify whether the hand is estimated to be a left hand or a right hand of the person. In some examples, a sign (e.g., positive or negative) of the aggregated value determines whether the hand is identified as the left hand or the right hand.

As another example, the XR device determines that a ratio between segments estimated to be bent in the positive direction and segments estimated to be bent in the negative direction satisfies one or more predetermined criteria, and identifies whether the hand is estimated to be the left hand or the right hand based on determining that the one or more predetermined criteria is satisfied. For example, if more than a threshold number or threshold percentage of segments are estimated to be bent in the positive direction relative to the reference vector, the XR device identifies the hand as the right hand.

In some examples, the aforementioned technique involving the reference vector and bending angles is utilized in addition to another computerized technique for chirality estimation. In other words, a rules-based approach can be applied in combination with inference performed by a machine learning-based system. For example, in addition to the aforementioned technique, the XR device also executes (or instructs execution of) a machine learning model that processes tracking data to generate a further estimated chirality. The XR device compares the estimated chirality as determined using the reference vector technique with the further estimated chirality as inferred by the machine learning model and then generates a final chirality estimate.

In various examples in the present disclosure, once the XR device has obtained or estimated the chirality of the hand, operation of the XR device is automatically controlled using such chirality information. The XR device performs, for instance, gesture detection based on the estimated chirality or renders a user interface according to a format associated with the estimated chirality.

As mentioned, subject matter in the present disclosure addresses technical challenges associated with hand chirality estimation. By measuring bending angles around a geometrically defined reference vector, examples described herein provide a more robust and reliable method for estimating hand chirality, thereby enhancing accuracy even in challenging environments, such as in poor lighting conditions.

Trained machine learning models may perform suboptimally when dealing with a wide variability in hand shapes, sizes, and movements among different users. Errors in chirality determinations can result in downstream errors in tracking and interpreting user gestures, particularly when the system encounters hand images that deviate substantially from training data. Examples described herein improve flexibility or adaptability to different user hand configurations by dynamically determining positions of a plurality of joints of a hand and calculating bending angles based on these positions. Accordingly, techniques described herein do not rely on a "one-size-fits-all" model but rather adjust processing parameters in real-time.

Rapid chirality estimation can be beneficial in real-time XR applications, where delays or sluggish response times can disrupt the immersive experience and lead to user discomfort or disorientation. Examples described herein provide a streamlined and efficient process that reduces computational load or latency, while maintaining high performance and responsiveness in real-time XR applications. Examples of computing resources that can be reduced, saved, or more efficiently leveraged include processor cycles, network traffic, memory usage, data storage capacity, power consumption, network bandwidth, or cooling capacity.

In light of one or more features described in the present disclosure, some examples provide improvements in the functioning of an XR device. Examples of improvements include greater accuracy or robustness in estimating hand chirality, enhanced computational efficiency (e.g., by reducing the computational load required for chirality estimation), and reduced latency. As a result, the quality of user experience can be improved and/or practical applications of XR technology can be expanded, for example, to various XR experiences in which precision and reliability of hand chirality determinations are desired.

FIG. 1 is a network diagram illustrating a network environment 100 suitable for operating an XR device 110, according to some examples. The network environment 100 includes an XR device 110 and a server 112, communicatively coupled to each other via a network 104. The server 112 may be part of a network-based system. For example, the network-based system may be or include a cloud-based server system that provides additional information, such as virtual content (e.g., 3D models of virtual objects, or augmentations to be applied as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human). The user 106 is not part of the network environment 100, but is associated with the XR device 110. For example, where the XR device 110 is a head-wearable apparatus, the user 106 wears the XR device 110 during a user session.

The XR device 110 may have different display arrangements. In some examples, the display arrangement may include a screen that displays what is captured with a camera of the XR device 110. In some examples, the display of the device may be transparent or semi-transparent. In some examples, the display may be non-transparent and wearable by the user to cover the field of vision of the user.

The user 106 operates an application of the XR device 110, referred to herein as an AR application. The AR application may be configured to provide the user 106 with an experience triggered or enhanced by a physical object 108, such as a two-dimensional (2D) physical object (e.g., a picture), a 3D physical object (e.g., a statue), a location (e.g., at factory), or any references (e.g., perceived corners of walls or furniture, QR codes) in the real-world physical environment. For example, the user 106 may point a camera of the XR device 110 to capture an image of the physical object 108 and a virtual overlay may be presented over the physical object 108 via the display.

Experiences may also be triggered or enhanced by a hand or other body part of the user 106. For example, the XR device 110 detects and responds to hand gestures. The XR device 110 may also present information content or control items, such as user interface elements, to the user 106 during a user session.

The XR device 110 includes one or more tracking systems or tracking components (not shown in FIG. 1). The tracking components track the pose (e.g., position and orientation) of the XR device 110 relative to a real-world environment 102 using image sensors (e.g., depth-enabled 3D camera, or image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102. The tracking components can also track the pose of real-world objects, such as the physical object 108 or the hand of the user 106.

In some examples, the server 112 is used to detect and identify the physical object 108 based on sensor data (e.g., image and depth data) from the XR device 110, and determine a pose of the XR device 110 and the physical object 108 based on the sensor data. The server 112 can also generate a virtual object or other virtual content based, for example, on the pose of the XR device 110 and the physical object 108.

In some examples, the server 112 communicates virtual content to the XR device 110. In other examples, the XR device 110 obtains virtual content through local retrieval or generation. The XR device 110 or the server 112, or both, can perform image processing, object detection, and object tracking functions based on images captured by the XR device 110 and one or more parameters internal or external to the XR device 110.

The object recognition, tracking, and AR rendering can be performed on either the XR device 110, the server 112, or a combination between the XR device 110 and the server 112. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

Machines, components, or devices shown in FIG. 1 may be implemented in a general-purpose computer modified (e.g., configured or programmed) by software to be a special-purpose computer to perform one or more of the functions described herein for that machine, component, or device. For example, a computer system able to implement one or more of the methodologies described herein is discussed below with respect to FIG. 10. Two or more of the machines, components, or devices illustrated in FIG. 1 may be combined into a single machine, and the functions described herein for any single machine, component, or device may be subdivided among multiple machines, component, or devices.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
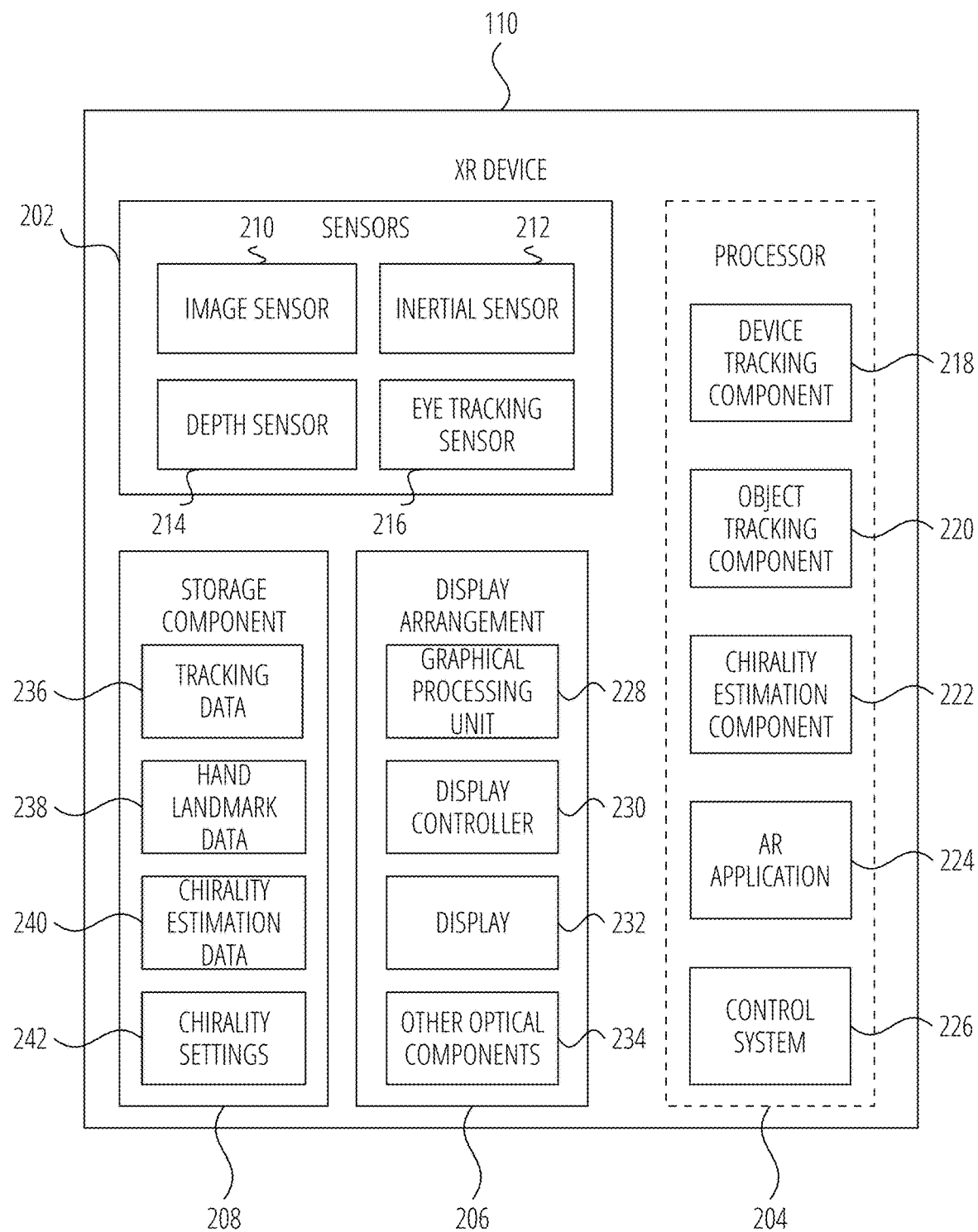
FIG. 2 is a block diagram illustrating components of an XR device, according to some examples.

FIG. 2 is a block diagram illustrating components (e.g., modules, parts, systems, or subsystems) of the XR device 110, according to some examples. The XR device 110 is shown to include sensors 202, a processor 204, a display arrangement 206, and a storage component 208. It will be appreciated that FIG. 2 is not intended to provide an exhaustive indication of components of the XR device 110.

The sensors 202 include one or more image sensors 210, one or more inertial sensors 212, one or more depth sensors 214, and one or more eye tracking sensors 216. The image sensor 210 includes one or more of a color camera, a thermal camera, or a grayscale, global shutter tracking camera. The image sensor 210 may include more than one of the same cameras (e.g., multiple color cameras).

The inertial sensor 212 includes, for example, a combination of a gyroscope, accelerometer, and a magnetometer. In some examples, the inertial sensor 212 includes one or more Inertial Measurement Units (IMUs). An IMU enables tracking of movement of a body by integrating the acceleration and the angular velocity measured by the IMU. An IMU may include a combination of accelerometers and gyroscopes that can determine and quantify linear acceleration and angular velocity, respectively. The values obtained from the gyroscopes of the IMU can be processed to obtain the pitch, roll, and heading of the IMU and, therefore, of the body with which the IMU is associated. Signals from the accelerometers of the IMU also can be processed to obtain velocity and displacement. In some examples, the magnetic field is measured by the magnetometer to provide a reference for orientation, helping to correct any drift in the gyroscope and/or accelerometer measurements, thereby improving the overall accuracy and stability of the estimations.

The depth sensor 214 may include one or more of a structured-light sensor, a time-of-flight sensor, a passive stereo sensor, and an ultrasound device. The eye tracking sensor 216 is configured to monitor the gaze direction of the user, providing data for various applications, such as adjusting the focus of displayed content or determining a zone of interest in the field of view. The XR device 110 may include one or multiple eye tracking sensors 216, such as infrared eye tracking sensors, corneal reflection tracking sensors, or video-based eye-tracking sensors.

Other examples of sensors 202 include a proximity or location sensor (e.g., near field communication, GPS, Bluetooth™, Wi-Fi™), an audio sensor (e.g., a microphone), or any suitable combination thereof. It is noted that the sensors 202 described herein are for illustration purposes and the sensors 202 are thus not limited to the ones described above.

The processor 204 implements or causes execution of a device tracking component 218, an object tracking component 220, a chirality estimation component 222, an AR application 224, and a control system 226.

The device tracking component 218 estimates a pose of the XR device 110. For example, the device tracking component 218 uses data from the image sensor 210 and the inertial sensor 212 to track the pose of the XR device 110 relative to a frame of reference (e.g., real-world environment 102). In some examples, the device tracking component 218 uses tracking data to determine the 3D pose of the XR device 110. The 3D pose is a determined orientation and position of the XR device 110 in relation to the user's real-world environment 102. The device tracking component 218 continually gathers and uses updated sensor data describing movements of the XR device 110 to determine updated poses of the XR device 110 that indicate changes in the relative position and orientation of the XR device 110 from the physical objects in the real-world environment 102.

A "SLAM" (Simultaneous Localization and Mapping) system or other similar system may be used to understand and map a physical environment in real-time. This allows, for example, an XR device to accurately place digital objects in the real world and track their position as a user moves and/or as objects move. The XR device 110 may include a "VIO" (Visual-Inertial Odometry) system that combines data from an IMU and a camera to estimate the position and orientation of an object in real-time. In some examples, a VIO system may form part of a SLAM system, e.g., to perform the "Localization" function of the SLAM system.

The object tracking component 220 enables the tracking of an object, such as the physical object 108 of FIG. 1 or a hand of a user. The object tracking component 220 may include a computer-operated application or system that enables a device or system to track visual features identified in images captured by one or more image sensors, such as one or more cameras. In some examples, the object tracking system builds a model of a real-world environment based on the tracked visual features. An object tracking system may implement one or more object tracking machine learning models to detect and/or track an object in the field of view of a user during a user session.

An object tracking machine learning model may comprise a neural network trained on suitable training data to identify and track objects in a sequence of frames captured by the XR device 110. An object tracking machine learning model typically uses an object's appearance, motion, landmarks, and/or other features to estimate location in subsequent frames.

In some examples, the object tracking component 220 implements a landmark detection system (e.g., using a landmark detection machine learning model). For example, based on images captured using stereo cameras of the image sensors 210, the object tracking component 220 identifies 3D landmarks associated with joints of a hand of the user 106. In other words, the object tracking component 220 can detect and track the 3D positions of various joints (or other landmarks, such as bones or other segments of the hand) on the hand as the hand moves in the field of view of the XR device 110. In some examples, positions and orientations (e.g., relative angles) of the landmarks are tracked. It is noted that 3D positions of landmarks can also be obtained in other ways. For example, in addition to images captured using cameras, the XR device 110 can use the depth sensor 214 to identify 3D landmarks. As another example, one or more tracking units (e.g., IMUs) worn on or held by a hand of a user can communicate with the XR device 110 to provide 3D positions or improve the accuracy of 3D position estimations.

In some examples, the object tracking component 220 is calibrated for a specific set of features. For example, when the object tracking component 220 performs hand tracking, a calibration component calibrates the object tracking component 220 by using a hand calibration, such as a hand size calibration for a particular user of the XR device 110. The calibration component can perform one or more calibration steps to measure or estimate hand features, such as the size of a hand and/or details of hand landmarks (e.g., fingers and joints). This may include bone length calibrations.

The chirality estimation component 222 processes tracking data to estimate or identify the chirality of a hand, such as a hand of the user 106. In some examples, the chirality estimation component 222 receives 3D landmark data generated by the object tracking component 220 and uses the 3D landmark data to estimate whether the hand is a left hand or a right hand.

In some examples, the chirality estimation component 222 utilizes algorithms that include geometric calculations, statistical analysis, or other rules-based approaches to interpret the positions of hand joints and the spatial orientation of the hand based on input from one or more of the sensors 202. For instance, and as described in greater detail elsewhere, the chirality estimation component 222 computes bending angles associated with adjacent bones of the fingers and uses the computed bending angles to determine chirality.

The AR application 224 may retrieve a virtual object (e.g., 3D object model) based on an identified physical object 108 or physical environment (or other real-world feature), or retrieve an augmentation or digital effect to apply to the physical object 108. A graphical processing unit 228 of the display arrangement 206 causes display of the virtual object, augmentation, digital effect, or the like. In some examples, the AR application 224 includes a local rendering engine that generates a visualization of a virtual object overlaid (e.g., superimposed upon, or otherwise displayed in tandem with) on an image of the physical object 108 (or other real-world feature) captured by the image sensor 210. A visualization of the virtual object may be manipulated by adjusting a position of the physical object or feature (e.g., its physical location, orientation, or both) relative to the image sensor 210. Similarly, the visualization of the virtual object may be manipulated by adjusting a pose of the XR device 110 relative to the physical object or feature.

The control system 226 of the XR device 110 can control various settings, modes, or operations of the XR device 110. In the context of chirality estimations, the control system 226 is configured to control operation of the XR device 110 based on an estimated or identified chirality of a hand. For example, the control system 226 instructs the object tracking component 220 regarding which hand tracking model to use based on whether a hand is a left hand or a right hand. The control system 226 can also work with the AR application 224 and/or other components (e.g., the graphical processing unit 228) to cause virtual content to be presented in a particular format or arrangement depending on whether a particular hand (e.g., the dominant hand of the user) is a left hand or a right hand.

Referring again to the graphical processing unit 228, the graphical processing unit 228 may include a render engine that is configured to render a frame of a 3D model of a virtual object based on the virtual content provided by the AR application 224 and the pose of the XR device 110 (and, in some cases, the position of a tracked object). In other words, the graphical processing unit 228 communicates with the AR application 224 to apply the three-dimensional pose of the XR device 110 to generate frames of virtual content to be presented on a display 232. For example, the graphical processing unit 228 uses the 3D pose to render a frame of the virtual content such that the virtual content is presented at an orientation and position in the display 232 to properly augment the user's reality. As an example, the graphical processing unit 228 may use the 3D pose data to render a frame of virtual content such that, when presented on the display 232, the virtual content is caused to be presented to a user so as to overlap with a physical object in the user's real-world environment 102.

In some examples, the AR application 224 can work with the graphical processing unit 228 to generate updated frames of virtual content based on updated poses of the XR device 110 and updated tracking data generated by the abovementioned tracking components, which reflect changes in the position and orientation of the user in relation to physical objects in the user's real-world environment 102, thereby resulting in a more immersive experience.

The graphical processing unit 228 transfers the rendered frame to a display controller 230. The display controller 230 is positioned as an intermediary between the graphical processing unit 228 and the display 232, receives the image data (e.g., rendered frame) from the graphical processing unit 228, re-projects the frame (by performing a warping process) based on a latest pose of the XR device 110 (and, in some cases, object tracking pose forecasts or predictions), and provides the re-projected frame to the display 232.

In some examples, the display 232 is not directly in the gaze path of the user. For example, the display 232 can be offset from the gaze path of the user and other optical components 234 direct light from the display 232 into the gaze path. The other optical components 234 include, for example, one or more mirrors, one or more lenses, or one or more beam splitters.

It will be appreciated that, in examples where an XR device includes multiple displays, each display can have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement can deliver separate images or video streams to each eye. Where an XR device includes multiple displays, steps may be carried out separately and substantially in parallel for each display, in some examples, and pairs of features or components may be included to cater for both eyes.

For example, an XR device captures separate images for a left eye display and a right eye display (or for a set of right eye displays and a set of left eye displays), and renders separate outputs for each eye to create a more immersive experience and to adjust the focus and convergence of the overall view of a user for a more natural, 3D view. Thus, while a single set of display arrangement components is shown in FIG. 2, similar techniques may be applied to cover both eyes by providing a further set of display arrangement components.

Still referring to FIG. 2, the storage component 208 stores various data, such as tracking data 236, hand landmark data 238, chirality estimation data 240, and/or chirality settings 242. The tracking data 236 may include data obtained from one or more of the sensors 202, such as image data from the image sensor 210, eye tracking data from the eye tracking sensor 216, depth maps generated by the XR device 110, or the like. The tracking data 236 can also include data related to the position, velocity, and/or acceleration of a user's hand movements.

In some examples, the tracking data 236 includes "raw" data obtained from the sensors, and the "raw" data is processed by the object tracking component 220 to determine the hand landmark data 238. For example, the tracking data 236 includes image data, and the image data is processed by the object tracking component 220 to generate the hand landmark data 238. The hand landmark data 238 includes positions of a plurality of joints of the hand. The positions can be tracked over time to provide a time-based sequence of positions.

The chirality estimation data 240 includes data utilized to estimate hand chirality. For example, the chirality estimation data 240 includes reference vectors and/or bending angles as computed by the chirality estimation component 222, or aggregated values used to determine whether a hand is a left hand or a right hand. The chirality settings 242 record information regarding the determined chirality of a hand as processed by chirality estimation component 222. The chirality settings 242 may include not only a final determination of left or right-handedness but also the intermediate computational values that led to this determination. Chirality settings 242 can be used to personalize user experiences in XR applications, adjust control schemes, or modify virtual environments according to the user's hand preference or currently used hand, thereby enhancing the overall usability and accessibility of the XR device 110.

One or more of the components described herein may be implemented using hardware (e.g., a processor of a machine) or a combination of hardware and software. For example, a component described herein may configure a processor to perform the operations described herein for that component. Moreover, two or more of these components may be combined into a single component, and the functions described herein for a single component may be subdivided among multiple components. Furthermore, according to various examples, component described herein as being implemented within a single machine, database, component, or device may be distributed across multiple machines, databases, components, or devices.

Figure 3:
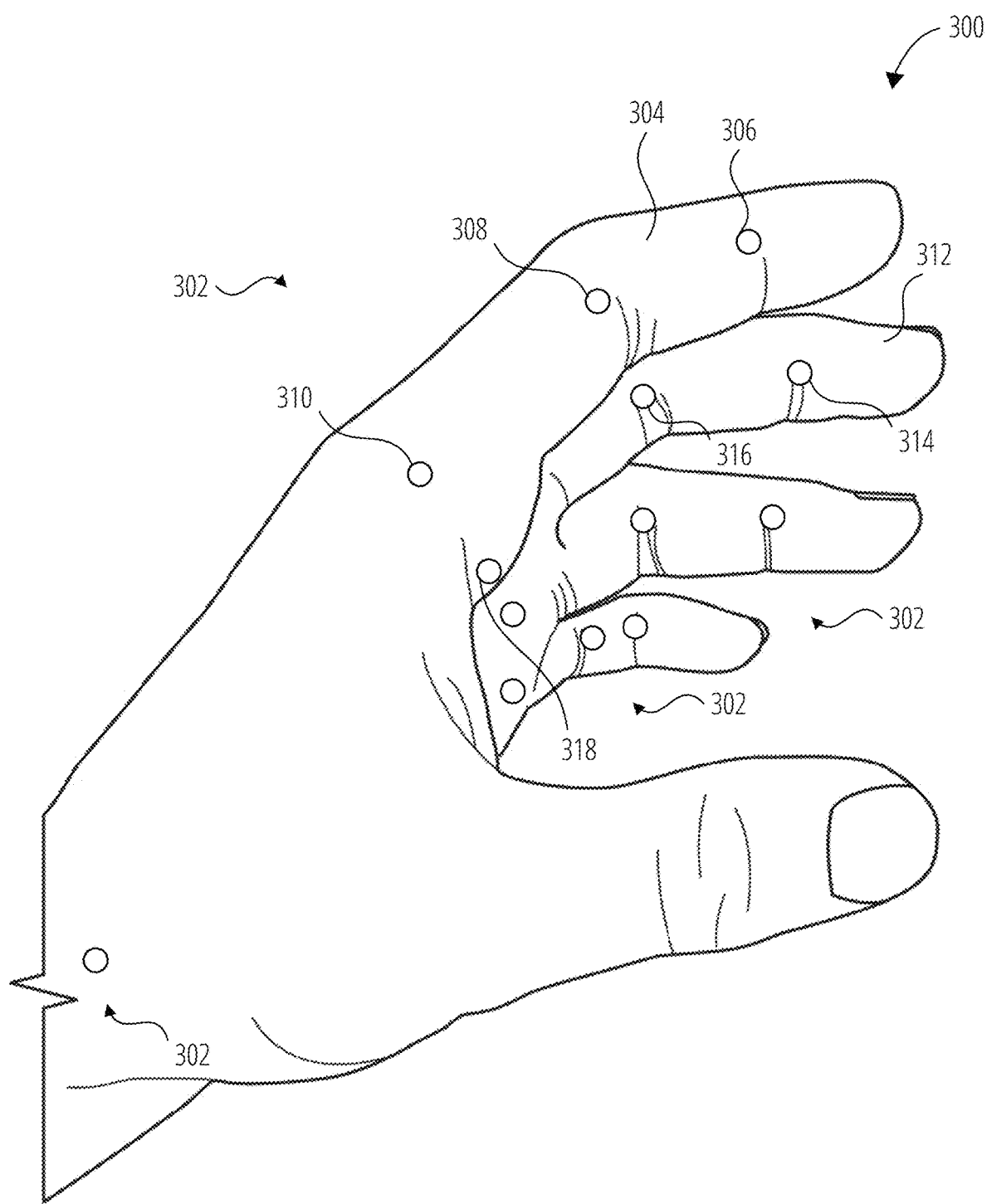
FIG. 3 is a perspective view of a hand of a user of an XR device, wherein multiple landmarks are illustrated on the hand, according to some examples.

FIG. 3 is a perspective view of a hand 300 of a user of an XR device, such as the XR device 110 of FIG. 1, according to some examples. The hand 300 of FIG. 3 is a left hand.

The XR device can be an AR device that provides an AR experience by presenting virtual content, such as user interface elements, digital effects, virtual objects, or the like, to the user. To describe certain aspects below with reference to FIG. 3 and FIG. 4, the XR device 110 is used as a non-limiting example. It will be appreciated that at least some examples can also be implemented using other devices.

As mentioned, the XR device 110 can be configured to use hand gestures of the user as inputs or triggers (e.g., the user can make selections or adjustments in the context of an AR experience via hand gestures detected by the XR device 110). The XR device 110 tracks the hand 300 using joint positions 302. For example, the joint positions 302 are obtained dynamically via the object tracking component 220 of FIG. 2 by processing data from one or more of the sensors 202.

Merely as non-limiting examples of the joint positions 302, FIG. 3 illustrates, overlaid on an index finger 304 of the hand 300, a tracked position of its distal interphalangeal (DIP) joint as DIP joint position 306, a tracked position of its proximal interphalangeal (PIP) joint as PIP joint position 308, and a tracked position of its MCP joint as MCP joint position 310. Further, FIG. 3 illustrates, overlaid on a middle finger 312 of the hand 300, a tracked position of its DIP joint as DIP joint position 314, a tracked position of its PIP joint as PIP joint position 316, and a tracked position of its MCP joint as MCP joint position 318.

In some examples, the joint positions 302 are 3D landmarks that allow the XR device 110 to be aware of and/or track the positions of the joints of the hand 300 in the real world. Each of the joint positions 302 can be expressed using, for instance, (x, y, z) coordinates in a suitable frame of reference (e.g., relative to the XR device 110 or in the context of some other defined frame of reference).

Figure 4:
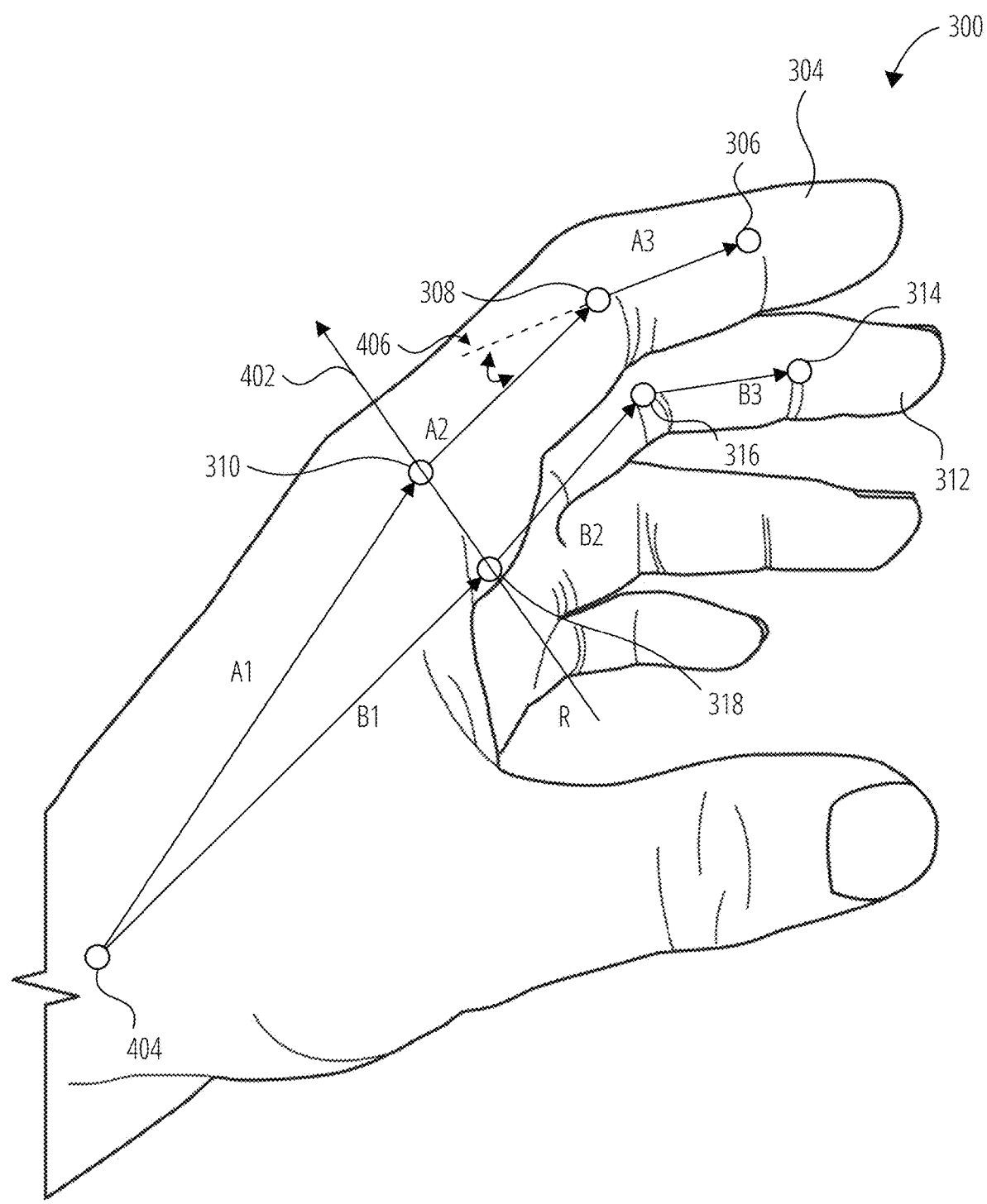
FIG. 4 is a perspective view of the hand of FIG. 3, wherein multiple landmarks, bending angles, and a reference vector are illustrated relative to the hand, according to some examples.

FIG. 4 also illustrates the hand 300 of FIG. 3, and further shows a reference vector 402 (also marked "R" in FIG. 4), according to some examples. The reference vector 402 is generated by the XR device 110 based on the positions of multiple MCP joints.

In the example shown in FIG. 4, the reference vector 402 is generated by fitting a line to the MCP joint position 310 of the index finger 304 and the MCP joint position 318 of the middle finger 312 in 3D space, and the direction of the reference vector 402 is the direction from the MCP joint position 318 of the middle finger 312 to the MCP joint position 310 of the index finger 304. The reference vector 402 of FIG. 4 may thus also be referred to as a "knuckle vector" in this case.

The chirality settings 242 of the XR device 110 can include rules for determining the reference vector 402, such as between which landmarks the reference vector 402 should extend, and how its vector direction is determined. The processor 204 of the XR device 110 implements such rules to generate or set the reference vector 402.

More generally, as used in the present disclosure, a "reference vector" includes a vector that is used as a baseline or reference for measuring other vectors, directions, or positions in a given space. In the context of determining bending angles, as is described in greater detail below, a reference vector establishes a directional baseline against or around which bending or curling of finger joints can be measured. This can allow an XR device (e.g., the XR device 110) to determine, for example, that a hand is a right hand if most or all of the bending or curling of fingers occurs in a particular direction around the reference vector, or that the hand is a left hand if most or all of the bending or curling of fingers occurs in the opposite direction around the reference vector.

The reference vector 402 depicted in FIG. 4 is merely an example, and reference vectors can be generated based on other tracked positions or body parts. For example, any combination of two or more MCP joints selected from an index finger, middle finger, ring finger, or pinky finger can be used (e.g., index finger and ring finger, index finger and pinky finger, middle finger and pinky finger, three of the four fingers, or all four of the fingers).

The XR device 110 uses at least some of the joint positions 302 together with the reference vector 402 to estimate the chirality of the hand 300. In the case of FIG. 4, the XR device 110 uses only the joints of the index finger 304 and the middle finger 312, as well as a wrist joint position 404. Again, this is merely an example, and it will be apparent that other joints, such as the joints of the ring finger and/or pinky finger, could also be used, and that other combinations of fingers could be used (e.g., not necessarily the index finger and the middle finger).

Based on the joint positions 302 (e.g., as obtained via the object tracking component 220), the XR device 110 is able to compute vectors that extend between certain adjacent joints. Table 1 below summarizes the example vectors that are shown in FIG. 4.

TABLE 1

Examples of vectors extending between joints

| Vector | Starting point | End point |
| --- | --- | --- |
| A1 | wrist joint position 404 | MCP joint position 310 |
| A2 | MCP joint position 310 | PIP joint position 308 |
| A3 | PIP joint position 308 | DIP joint position 306 |
| B1 | wrist joint position 404 | MCP joint position 318 |
| B2 | MCP joint position 318 | PIP joint position 316 |
| B3 | PIP joint position 316 | DIP joint position 314 |

For example, and as will be evident from FIG. 4, the XR device 110 computes vector A1 as the vector extending from the wrist joint position 404 to the MCP joint position 310, the vector A2 as the one extending from the MCP joint position 310 to the PIP joint position 308, and the vector A3 as the one extending from the PIP joint position 308 to the DIP joint position 306. Accordingly, in some examples, pairs of directly connected vectors (associated with the same finger) represent pairs of articulating bones of the hand 300. For example, the vector pair (A2, A3) in FIG. 4 represents the articulating proximal and middle phalanges of the index finger 304.

The angle that exists between a pair of directly connected vectors associated with the same finger of the hand 300 can be analyzed in a chirality estimation. The XR device 110 determines a bending angle between respective pairs of articulating bones in relation to the reference vector 402. Specifically, in the case of FIG. 4, the XR device normalizes the vectors A1, A2, A3, B1, B2, and B3, as well as the reference vector 402 (R), and then proceeds to compute the various bending angles around the reference vector 402.

As a non-limiting example, an angle 406 between a pair of articulating bones represented by the vectors A2 and A3 is conceptually depicted in FIG. 4. In the example of FIG. 4, to compute the relevant bending angle associated with the articulating bones represented by the vectors A2 and A3, the XR device 110 can automatically perform the following first set of example computations:

1. The vectors A2 and A3, as well as the vector R, are normalized.
2. The cross product of A2 and A3 is determined to obtain a resultant vector C (not shown).
3. The resultant vector C is projected on the vector R by way of a dot product computation.
4. The arccosine (inverse cosine) of the dot product provides the (absolute) bending angle between the vectors A2 and A3 with respect to the vector R.
5. The dot product is utilized to determine whether the bending angle is "positive" or "negative" (e.g., to determine a sign to add to the bending angle). If the dot product is positive, the resultant vector C (from operation 2) points in the same general direction as the reference vector, indicating positive bending relative to the vector R. If the dot product is negative, the resultant vector points generally in the opposite direction, indicating negative bending relative to the vector R. In some examples, a positive dot product indicates a counterclockwise bend around the vector R, while a negative dot product indicates a clockwise bend around the vector R.

Alternatively, to compute the relevant bending angle associated with the articulating bones represented by the vectors A2 and A3, the XR device 110 can automatically perform the following second set of example computations:

1. The vectors A2 and A3, as well as the vector R, are normalized.
2. The cross product of A2 and A3 is determined to obtain a resultant vector C (not shown).
3. The arccosine (inverse sine) of the norm of the resultant vector C provides the (absolute) bending angle between the vectors A2 and A3.
4. As with the first example above, to determine whether the bending angle is "positive" or "negative" (e.g., to determine a sign to add to the bending angle) the dot product is utilized. The resultant vector C is projected on the vector R by way of a dot product computation. If the dot product is positive, the resultant vector C points in the same general direction as the reference vector, indicating positive bending relative to the vector R. If the dot product is negative, the resultant vector points generally in the opposite direction, indicating negative bending relative to the vector R.

In some examples, the bending angle is indicative of the bending posture of the relevant part of the hand 300, and can be used to infer the chirality. The XR device 110 proceeds in the manner described above to compute all relevant bending angles, such as, in the case of FIG. 4, the angle between A1 and A2, the angle between A2 and A3, the angle between B1 and B2, as well as the angle between B2 and B3. The chirality settings 242 stored in the storage component 208 can be processed by the XR device 110 to determine which angles to compute and how to process the results. In some examples, the chirality settings 242 specify an assumption that fingers cannot bend "backwards" (e.g., in the opposite direction to the direction shown in FIG. 4) or can only bend "backwards" to a limited extent.

It will be appreciated that the angles between the vectors of Table 1 are merely examples, and that other or additional angles, such as those involving the ring finger or pinky finger, can be computed to obtain a different (e.g., larger) set of bending angles.

The XR device 110 then uses the multiple bending angles to estimate the chirality of the hand 300. For example, the XR device determines an aggregated measure or pattern that can suggest the overall orientation of the hand 300—whether it is a left or right hand. As one example, the XR device averages all bending angles (taking into account whether they are negative or positive) and checks whether the average value is a positive or negative value.

Using the technique of FIG. 4 as a non-limiting example, if the average value is positive, the XR device determines that the hand 300 is (or is likely to be) a right hand, and if the value is negative, it determines that the hand 300 is (or is likely to be) a left hand. This is based on the observation that, in many scenarios, the fingers of a user will generally be bent or curled differently depending on the hand that is being considered—in one general direction (e.g., counterclockwise) around the "knuckle vector" if it is the right hand, and in the opposite general direction (e.g., clockwise) around the "knuckle vector" if it is the left hand. It will be appreciated that other techniques may also be used by the XR device 110 to make a final determination or estimation of chirality, such as checking a ratio of positive to negative bending angles and basing the decision on the ratio.

Since the hand 300 of FIG. 3 is a left hand, the majority or all of the bending angles indicate bending or curling of fingers or finger segments in a counterclockwise manner around the reference vector 402. Accordingly, the XR device 110 generates an estimated chirality indicating that the hand 300 is predicted or deemed to be a left hand. The estimated chirality can be stored, for example, in the chirality estimation data 240 of the storage component 208 of FIG. 2.

Figure 5:
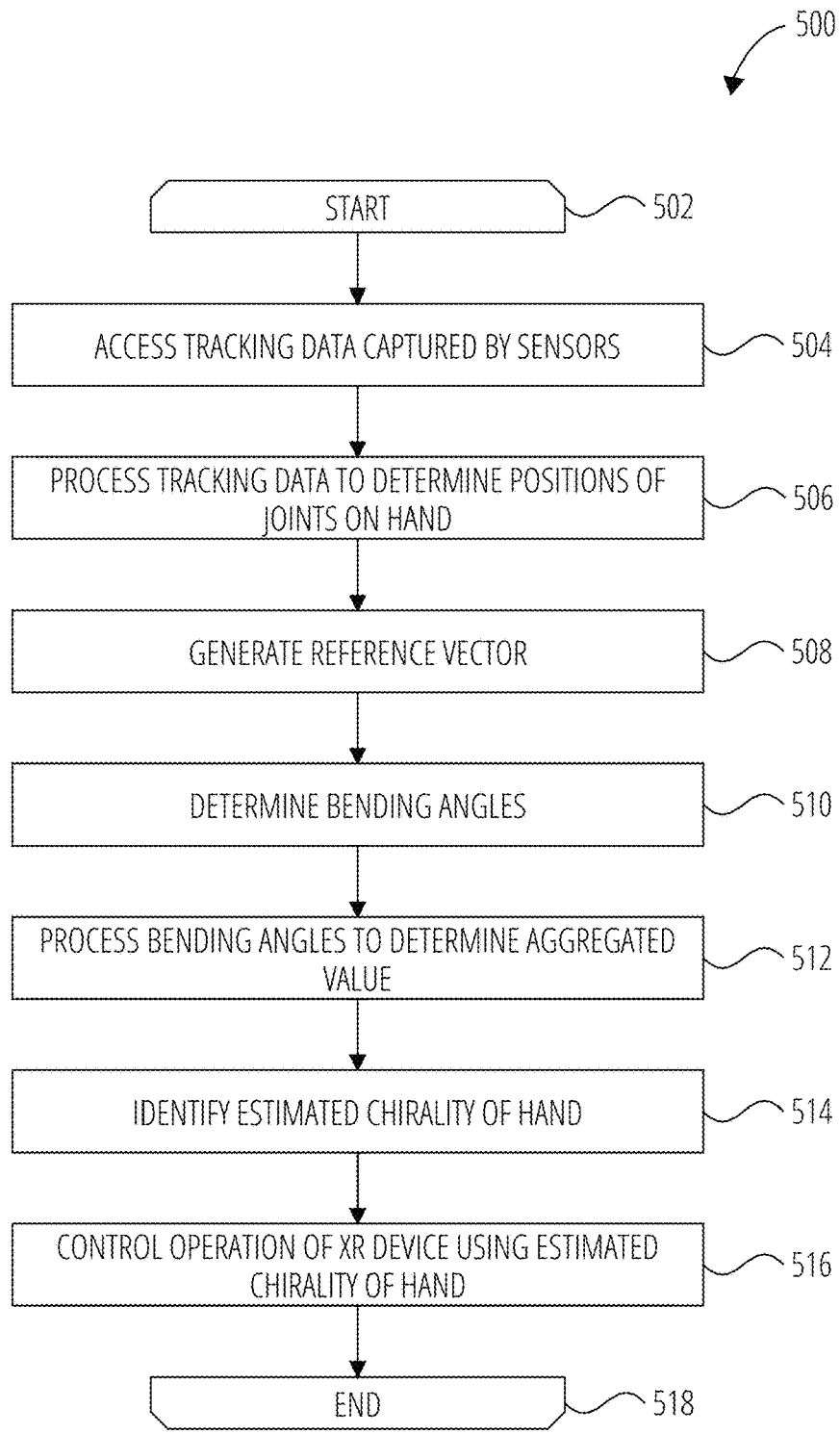
FIG. 5 is a flowchart illustrating operations of a method suitable for hand chirality estimation during a user session on an XR device, according to some examples.

FIG. 5 illustrates operations of a method 500 suitable for hand chirality estimation during a user session on an XR device, according to some examples. By way of example and not limitation, aspects of the method 500 may be performed by components, devices, systems, networks, or databases shown in FIG. 1 and FIG. 2, and they may accordingly be referenced below.

The method 500 starts at opening loop operation 502 and proceeds to operation 504, where the XR device 110 accesses tracking data captured by one or more of the sensors 202. For example, image sensors 210, in the form of a pair of cameras, capture images of a hand in the field of view of the XR device 110. In such cases, the cameras are spaced a distance apart and simultaneously capture images from slightly different angles, allowing for principles of stereoscopic vision to be applied. Tracking data can also be captured in other ways, such as from motion sensors on or near the hand.

At operation 506, the XR device 110 processes the tracking data to determine positions of joints on the hand (e.g., via the object tracking component 220). For example, the object tracking component 220 processes the images of the hand using computer vision techniques to perform landmark detection. In other words, in some examples, raw sensor data is processed into more meaningful information that includes the tracked or estimated positions of various joints on the hand. In some examples, the XR device 110 executes a hand detection or hand tracking machine learning model. When stereoscopic vision is utilized, feature matching can be applied to identify the positions of landmarks and triangulate their 3D coordinates.

At operation 508, the XR device 110 uses a subset of the positions of the joints to generate a reference vector. For example, and as described with reference to FIG. 4, the XR device 110 constructs a vector (e.g., a unit vector) that represents a direction from the MCP joint of the middle finger to the MCP joint of the index finger of the hand. In another example, the reference vector can represent a direction from the MCP joint of the pinky finger to the MCP joint of the index finger. This reference vector can then be used to determine or estimate how the fingers are bending or curling relative to the reference vector.

Bending angles are determined by the XR device 110 for pairs of adjacent finger bones, using the reference vector as a basis, at operation 510. For example, and as described with reference to FIG. 4, vectors extending between the joint positions define pairs of adjacent finger bones, and the XR device 110 assesses how these bones are positioned relative to each other and the reference vector.

In some examples, each pair of articulating bones of interest is represented by two vectors, and the vectors are normalized by the XR device 110 to ensure that they are purely directional and have a unit length. The cross product of the two vectors is computed, resulting in a third vector (resultant vector) that is perpendicular to the plane containing the two original vectors. In some examples, the resultant vector is projected on the reference vector, and the dot product is used to obtain the bending angle.

Once the bending angles have been computed for all relevant pairs of bones, the XR device 110 processes the bending angles to determine an aggregated value at operation 512 (e.g., using the chirality estimation component 222). In some examples, the XR device 110 determines an average of all the bending angles. In other examples, the XR device 110 determines the sum of all the bending angles. In other examples, the XR device 110 considers the directionality of the bending angles (e.g., the direction of the bend around the reference vector) and determines a ratio of positive to negative bends. Various types of aggregated values may thus be utilized, such as sums, averages, means, ratios, or percentages, depending on the implementation.

In some examples, the aggregated value indicates whether fingers of the hand are estimated to be (generally or primarily) bent in a positive direction or in a negative direction in relation to the reference vector. At operation 514, the XR device 110 determines whether the hand is estimated to be a left hand or a right hand. For example, if the aggregated value is above a certain threshold, the hand is deemed to be a right hand. Where the XR device 110 utilizes an average or sum of the bending angles (taking into account whether they each have a positive or negative sign), the threshold may be set at zero or another predetermined value. Referring to the examples of FIG. 4, if an aggregated value representing an average of all bending angles is greater than a threshold value of zero or another predetermined value, the XR device 110 can identify the hand as a right hand.

The method 500 proceeds to operation 516, where the XR device 110 controls operation of one or more of its components or features using the estimated chirality of the hand. Control operations may include selecting or adapting user interfaces, customizing gesture controls, or personalizing an XR environment to match the user's hand preference, thereby enhancing device performance and/or user experience. As mentioned, the XR device 110 may control detection or tracking functions (e.g., via the control system 226 and the object tracking component 220) during a user session on the XR device based on whether the hand to be tracked is a left hand or a right hand. For example, the XR device 110 may have optimized detection or tracking models for left hands and right hands, respectively, allowing for more accurate gesture detection or hand tracking. The method concludes at closing loop operation 518.

It is noted that, in some examples, the XR device 110 repeats at least some operations of the method 500. For example, the XR device 110 may obtain a set of joint positions of the hand at different points in time, and repeat operation 508, operation 510, operation 512, and operation 514 for each respective set of joint positions. This provides a plurality of hand chirality estimations for the same hand, potentially allowing the XR device 110 to produce a more reliable result.

It is further noted that, in certain cases, a hand might be captured in a configuration or pose in which all fingers are straight (not bent or curled), such as when the hand is flat on a table. In such cases, the XR device 110 may determine that the aggregated value is zero, or too close to zero, as a result of the absence of non-zero bending angles (or sufficient bending angles), and thus identify that the chirality of the hand cannot be accurately estimated using the method 500. The XR device 110 may be configured to continue to track the hand in response to such a determination, for example, to obtain more useful data (e.g., a different set of joint positions in which bending is present) and retry the estimation according to the method 500, or a supplementary technique can be used.

Figure 6:
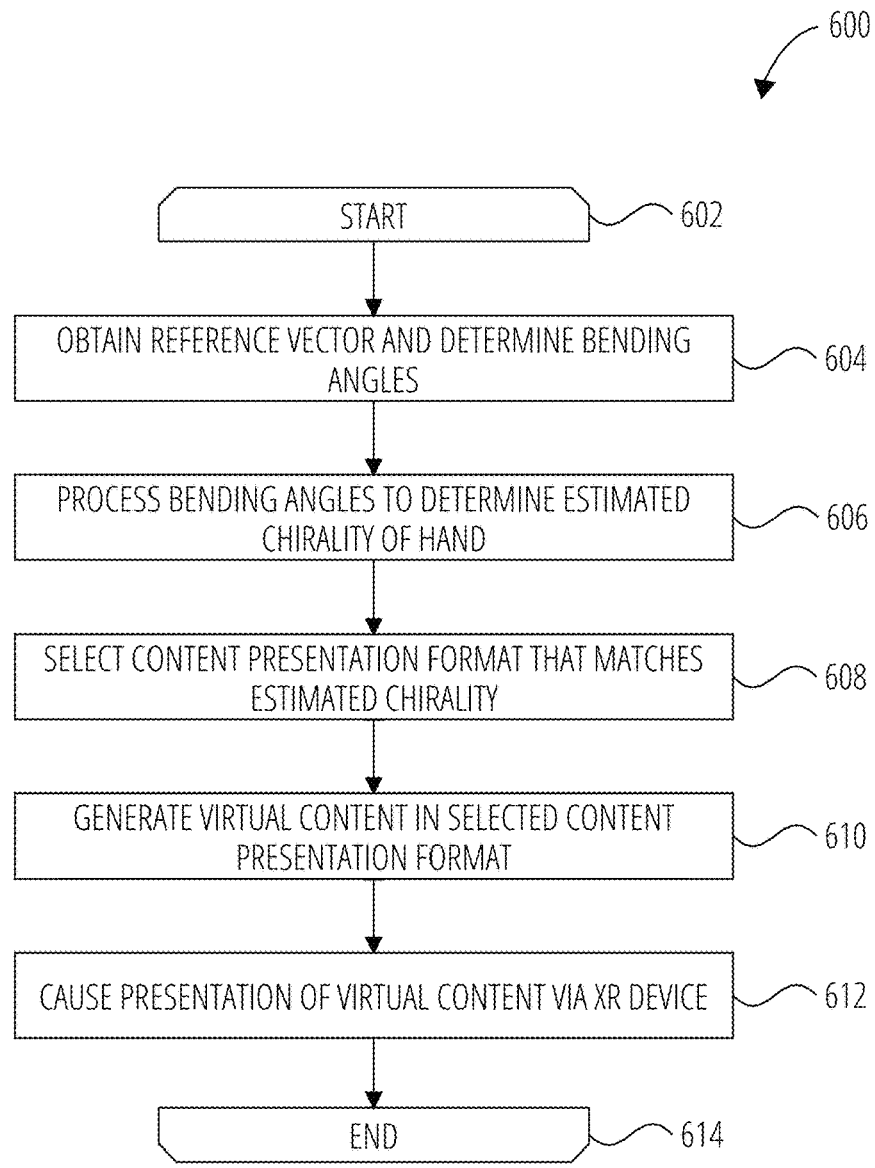
FIG. 6 is a flowchart illustrating operations of a method suitable for presenting virtual content via an XR device based on a hand chirality estimation, according to some examples.

FIG. 6 illustrates operations of a method 600 suitable for presenting virtual content via an XR device based on a hand chirality estimation, according to some examples. By way of example and not limitation, aspects of the method 600 may be performed by components, devices, systems, networks, or databases shown in FIG. 1 and FIG. 2, and they may accordingly be referenced below.

The method 600 commences at opening loop operation 602 and proceeds to operation 604, where the XR device 110 obtains a reference vector and determines a plurality of bending angles associated with respective pairs of articulating bones of a hand. In the case of FIG. 6, the hand that is analyzed by the XR device 110 is a dominant hand of the user of the XR device 110. For example, this can be the hand that the user predominantly uses to make user selections in an AR user interface of the AR application 224.

Tracking data for the hand can be obtained and processed, for example, as described with respect to operation 504 and operation 506 of FIG. 5. The reference vector and bending angles can be obtained, for example, as described with respect to operation 508 and operation 510 of FIG. 5, or as described with reference to FIG. 4.

At operation 606, the chirality estimation component 222 processes the bending angles to determine an estimated chirality of the hand. For example, the chirality estimation component 222 checks an aggregated value of the bending angles against a threshold value to determine the estimated chirality.

The method 600 proceeds to operation 608, where the control system 226 selects, or instructs the AR application 224 to select, a content presentation format that matches the estimated chirality. For example, the XR device 110 can have a stored or remotely accessible content presentation format for left-handed users and a (different) stored or remotely accessible content presentation format for right-handed users.

At operation 610, the XR device 110 generates virtual content in the selected content presentation format. The generated virtual content includes, for example, a user interface that has its elements (e.g., menus, tools, icons, and/or controls) arranged such that they appear close to, or otherwise conveniently positioned for, the dominant hand of the user. For instance, if the XR device 110 estimates that the dominant hand is the right hand, it generates virtual buttons for presentation on the right-hand side of a virtual content area. Conversely, if the XR device 110 estimates that the dominant hand is the left hand, it generates virtual buttons for presentation on the left-hand side of the virtual content area.

The XR device 110 then presents the generated virtual content to the user based on the selected content presentation format at operation 612 (e.g., using the display arrangement 206). In this way, one or more user interface elements or other virtual content (e.g., interactive objects) for interacting with the XR device 110 can be presented in a customized or personalized manner (e.g., positioned and oriented to match user hand chirality), making the XR experience more convenient or efficient.

The XR device 110 can, in some examples, adjust the content presentation format in real-time based on changes in user hand-usage patterns, or in response to detecting that a new user with a different dominant hand has started using the XR device 110. The method 600 concludes at closing loop operation 614.

Figure 7:
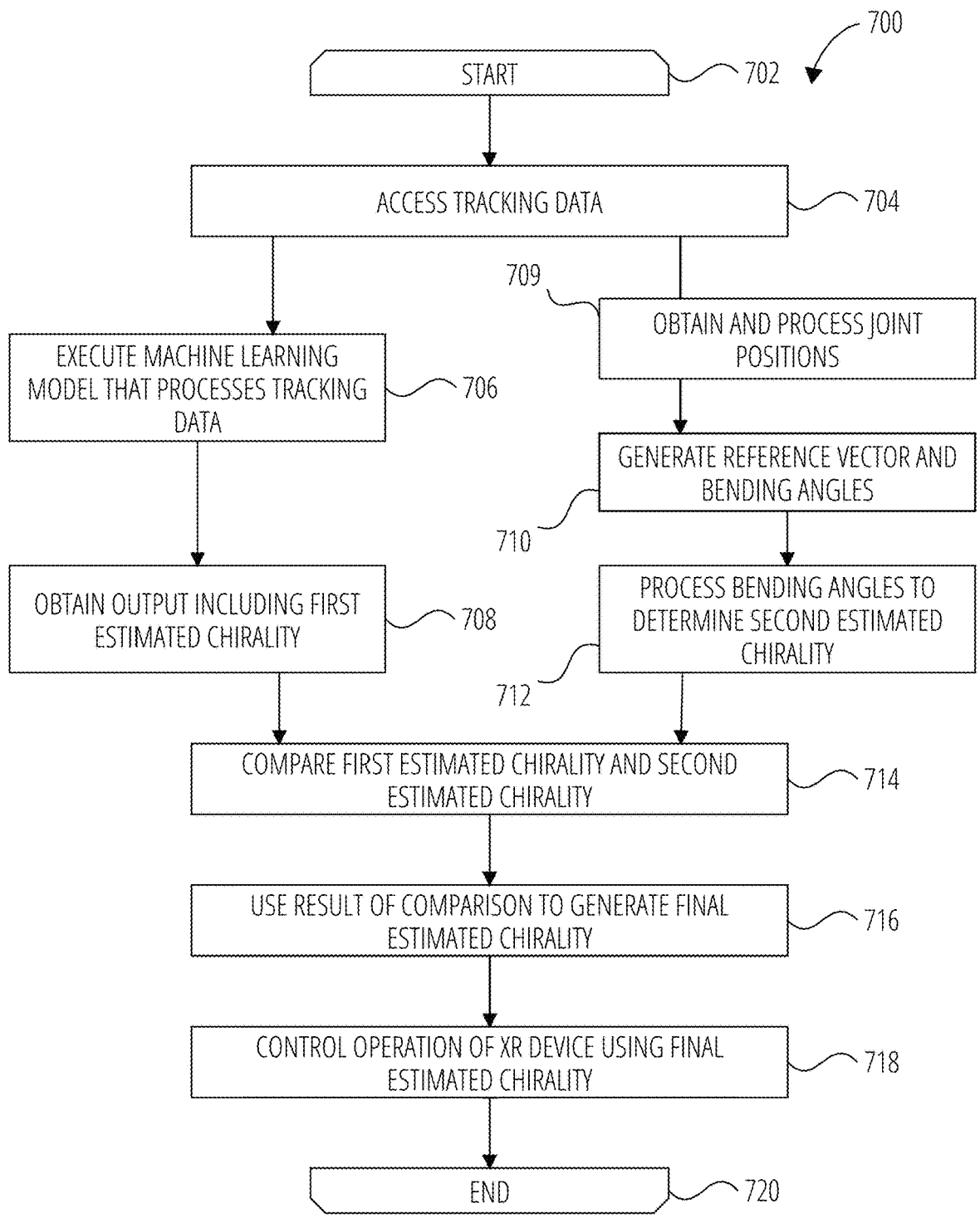
FIG. 7 is a flowchart illustrating operations of a method suitable for utilizing, by an XR device, two different techniques to determine an estimated chirality of a hand, according to some examples.

FIG. 7 illustrates operations of a method 700 suitable for utilizing two different techniques to determine an estimated chirality of a hand, according to some examples. By way of example and not limitation, aspects of the method 700 may be performed by components, devices, systems, networks, or databases shown in FIG. 1 and FIG. 2, and they may accordingly be referenced below. In the example of FIG. 7, the method 700 involves using both a machine learning-based technique and a (primarily) rules-based technique in an automated chirality estimation process.

The method 700 starts at opening loop operation 702 and proceeds to operation 704, where the XR device 110 accesses tracking data captured by one or more of the sensors 202. The tracking data includes one or more images of a hand of a user of the XR device 110.

At operation 706, the tracking data is processed via a machine learning model to obtain output (at operation 708) that includes a first estimated chirality of the hand. For example, the machine learning model is trained, using supervised learning, to predict whether a hand shown in a particular an input image is a left hand or a right hand.

In some examples, the machine learning model comprises a Convolutional Neural Network (CNN). The CCN performs feature extraction through convolutional layers, extracting relevant features of the hand such as edges and shapes, and predicts a probability of the hand being a left hand or a right hand. If, for instance, the CNN outputs a probability of 80% that the hand is a right hand, the XR device 110 classifies the hand as a right hand. As an example, the CNN may include:

Input layer: this layer takes an image as input.
Convolutional layers: these layers apply convolutional filters to extract features.
Pooling layers: These layers reduce spatial dimensions and help the machine learning model become invariant to small translations.
Fully connected layers: these layers combine the features to classify the image into a depiction of a left hand or a depiction of a right hand.
Output layer: this layer uses an activation function (e.g., softmax or sigmoid activation function) to output the probability of the image being a left hand or right hand.

To improve the robustness or reliability of chirality estimation, or to supplement operation 706 and operation 708, a rules-based technique involving reference vectors and bending angles is also executed. At operation 709, joint positions are obtained from the tracking data. For example, 2D positions of hand landmarks can be obtained for a pair of stereo (e.g., left and right) images. It is noted that machine learning techniques can be utilized to obtain such positional information for downstream use in the rules-based technique. Triangulation can be used to obtain 3D joint positions from the initial 2D positions.

At operation 710, the XR device 110 processes the positional information to generate a reference vector, and determines the relevant bending angles. The reference vector and bending angles can be obtained, for example, as described with respect to operation 508 and operation 510 of FIG. 5, or as described with reference to FIG. 4.

At operation 712, the XR device 110 processes the bending angles to determine a second estimated chirality. For example, the chirality estimation component 222 checks an aggregated value of the bending angles against a threshold value to determine the second estimated chirality.

The method 700 proceeds to operation 714, where the XR device 110 (e.g., via the chirality estimation component 222) compares the first estimated chirality with the second estimated chirality. The XR device 110 then uses a result of the comparison to generate a final estimated chirality (operation 716). Various rules may be used to determine the final estimated chirality. For example, the chirality settings 242 can indicate that, if the first estimated chirality and the second estimated chirality are the same, the XR device 110 uses that chirality and stores it as the identified chirality, while if the first estimated chirality and the second estimated chirality are different, the conflict is resolved according to predetermined resolution operations.

A conflict between the first estimated chirality and the second estimated chirality can be resolved by the XR device 110, for example, by:

automatically selecting an estimated chirality that has priority over the other estimated chirality (e.g., the chirality settings 242 specify that the second estimated chirality prevails over the first estimated chirality in the event of a conflict);

repeating operation 706 and operation 708 to determine whether the machine learning model (e.g., CNN) produces a different result that matches the second estimated chirality on a subsequent execution (if the results still do not match, the XR device 110 can proceed with a different resolution technique);

using the machine learning model's (e.g., CNN's) result if it outputs a probability score that exceeds a threshold, or, alternatively, using the rules-based technique's result if the machine learning model's probability score was below the threshold; or obtaining a new set of tracking data from one or more of the sensors 202 and repeating operations 706, operation 708, operation 709, operation 710, operation 712, and operation 714 using the new set of tracking data. These operations can be repeated on new sets of tracking data until the first estimated chirality matches the second estimated chirality.

Once the final estimated chirality has been selected by the XR device 110, the XR device 110 proceeds to control one or more operations using the final estimated chirality at operation 718. As mentioned, this may include selecting or adapting user interfaces based on the hand chirality, customizing gesture controls based on the hand chirality, personalizing an XR environment to match the user's hand preference, or tracking the hand based on the hand chirality, thereby enhancing device performance and/or user experience. The method 700 concludes at closing loop operation 720.

Figure 8:
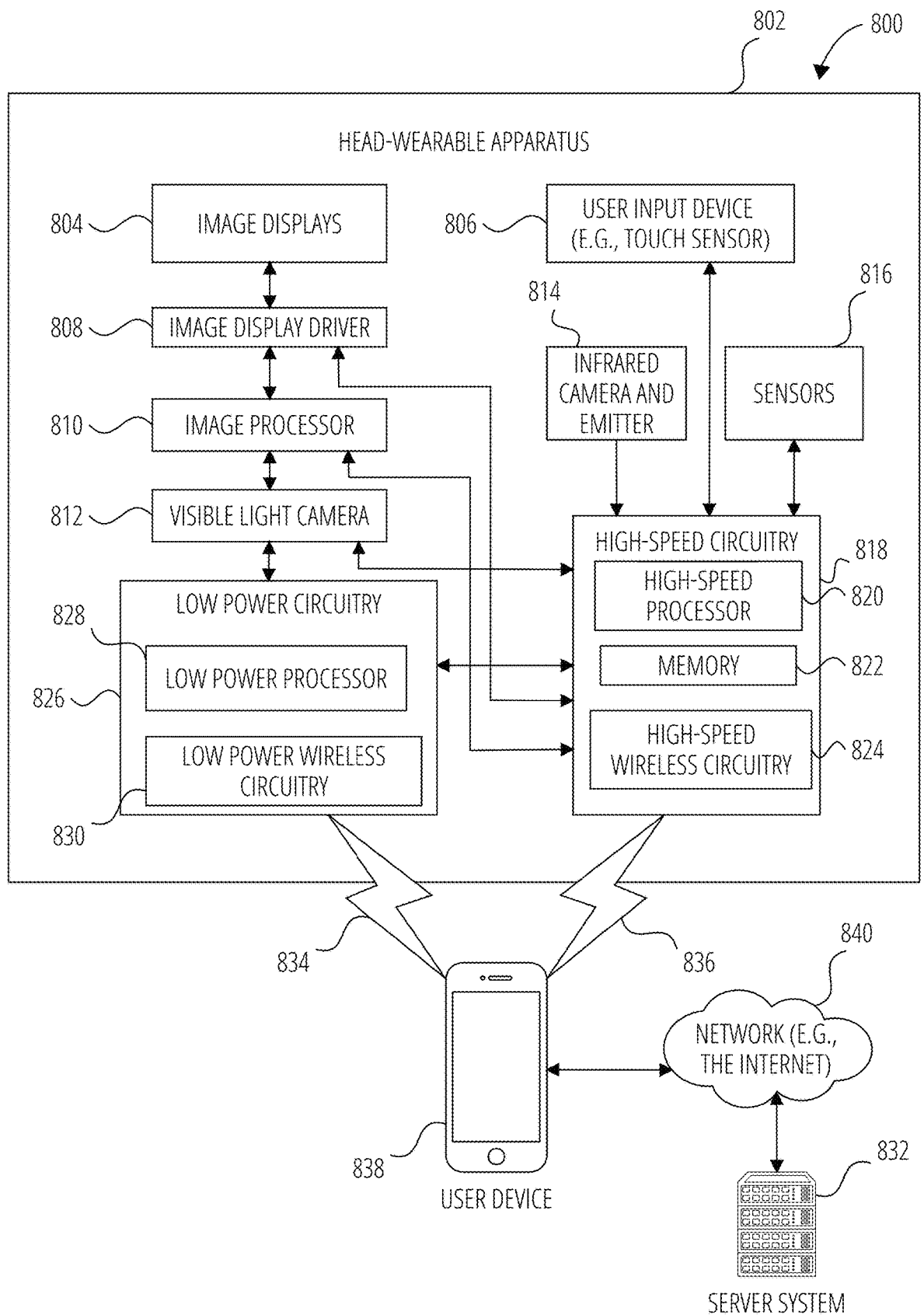
FIG. 8 illustrates a network environment in which a head-wearable apparatus can be implemented, according to some examples.

FIG. 8 illustrates a network environment 800 in which a head-wearable apparatus 802, such as a head-wearable XR device, can be implemented according to some examples. FIG. 8 provides a high-level functional block diagram of an example head-wearable apparatus 802 communicatively coupled a mobile user device 838 and a server system 832 via a suitable network 840. One or more of the techniques described herein may be performed using the head-wearable apparatus 802 or a network of devices similar to those shown in FIG. 8.

The head-wearable apparatus 802 includes a camera, such as at least one of a visible light camera 812 and an infrared camera and emitter 814. The head-wearable apparatus 802 includes other sensors 816, such as motion sensors or eye tracking sensors. The user device 838 can be capable of connecting with head-wearable apparatus 802 using both a communication link 834 and a communication link 836. The user device 838 is connected to the server system 832 via the network 840. The network 840 may include any combination of wired and wireless connections.

The head-wearable apparatus 802 includes a display arrangement that has several components. For example, the arrangement includes two image displays 804 of an optical assembly. The two displays include one associated with the left lateral side and one associated with the right lateral side of the head-wearable apparatus 802. The head-wearable apparatus 802 also includes an image display driver 808, an image processor 810, low power circuitry 826, and high-speed circuitry 818. The image displays 804 are for presenting images and videos, including an image that can provide a graphical user interface to a user of the head-wearable apparatus 802.

The image display driver 808 commands and controls the image display of each of the image displays 804. The image display driver 808 may deliver image data directly to each image display of the image displays 804 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 802 may include a frame and stems (or temples) extending from a lateral side of the frame, or another component to facilitate wearing of the head-wearable apparatus 802 by a user. The head-wearable apparatus 802 of FIG. 8 further includes a user input device 806 (e.g., touch sensor or push button) including an input surface on the head-wearable apparatus 802. The user input device 806 is configured to receive, from the user, an input selection to manipulate the graphical user interface of the presented image.

The components shown in FIG. 8 for the head-wearable apparatus 802 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 802. Left and right sides of the head-wearable apparatus 802 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 802 includes a memory 822 which stores instructions to perform a subset or all of the functions described herein. The memory 822 can also include a storage device. As further shown in FIG. 8, the high-speed circuitry 818 includes a high-speed processor 820, the memory 822, and high-speed wireless circuitry 824. In FIG. 8, the image display driver 808 is coupled to the high-speed circuitry 818 and operated by the high-speed processor 820 in order to drive the left and right image displays of the image displays 804. The high-speed processor 820 may be any processor capable of managing high-speed communications and operation of any general computing system needed for the head-wearable apparatus 802. The high-speed processor 820 includes processing resources needed for managing high-speed data transfers over the communication link 836 to a wireless local area network (WLAN) using high-speed wireless circuitry 824. In certain examples, the high-speed processor 820 executes an operating system such as a LINUX operating system or other such operating system of the head-wearable apparatus 802 and the operating system is stored in memory 822 for execution. In addition to any other responsibilities, the high-speed processor 820 executing a software architecture for the head-wearable apparatus 802 is used to manage data transfers with high-speed wireless circuitry 824. In certain examples, high-speed wireless circuitry 824 is configured to implement Institute of Electrical and Electronic Engineers (IEEE) 802.11 communication standards, also referred to herein as Wi-Fi™. In other examples, other high-speed communications standards may be implemented by high-speed wireless circuitry 824.

The low power wireless circuitry 830 and the high-speed wireless circuitry 824 of the head-wearable apparatus 802 can include short range transceivers (Bluetooth™) and wireless wide, local, or wide area network transceivers (e.g., cellular or Wi-Fi™). The user device 838, including the transceivers communicating via the communication link 834 and communication link 836, may be implemented using details of the architecture of the head-wearable apparatus 802, as can other elements of the network 840.

The memory 822 includes any storage device capable of storing various data and applications, including, among other things, camera data generated by the visible light camera 812, sensors 816, and the image processor 810, as well as images generated for display by the image display driver 808 on the image displays of the image displays 804. While the memory 822 is shown as integrated with the high-speed circuitry 818, in other examples, the memory 822 may be an independent standalone element of the head-wearable apparatus 802. In certain such examples, electrical routing lines may provide a connection through a chip that includes the high-speed processor 820 from the image processor 810 or low power processor 828 to the memory 822. In other examples, the high-speed processor 820 may manage addressing of memory 822 such that the low power processor 828 will boot the high-speed processor 820 any time that a read or write operation involving memory 822 is needed.

As shown in FIG. 8, the low power processor 828 or high-speed processor 820 of the head-wearable apparatus 802 can be coupled to the camera (visible light camera 812, or infrared camera and emitter 814), the image display driver 808, the user input device 806 (e.g., touch sensor or push button), and the memory 822. The head-wearable apparatus 802 also includes sensors 816, which may be the motion components 1034, position components 1038, environmental components 1036, and biometric components 1032, e.g., as described below with reference to FIG. 10. In particular, motion components 1034 and position components 1038 are used by the head-wearable apparatus 802 to determine and keep track of the position and orientation (the "pose") of the head-wearable apparatus 802 relative to a frame of reference or another object, in conjunction with a video feed from one of the visible light cameras 812, using for example techniques such as structure from motion (SfM) or VIO.

In some examples, and as shown in FIG. 8, the head-wearable apparatus 802 is connected with a host computer. For example, the head-wearable apparatus 802 is paired with the user device 838 via the communication link 836 or connected to the server system 832 via the network 840. The server system 832 may be one or more computing devices as part of a service or network computing system, for example, that include a processor, a memory, and network communication interface to communicate over the network 840 with the user device 838 and head-wearable apparatus 802.

The user device 838 includes a processor and a network communication interface coupled to the processor. The network communication interface allows for communication over the network 840, communication link 834 or communication link 836. The user device 838 can further store at least portions of the instructions for implementing functionality described herein.

Output components of the head-wearable apparatus 802 include visual components, such as a display (e.g., one or more liquid-crystal display (LCD)), one or more plasma display panel (PDP), one or more light emitting diode (LED) display, one or more projector, or one or more waveguide. The image displays 804 of the optical assembly are driven by the image display driver 808. The output components of the head-wearable apparatus 802 further include acoustic components (e.g., speakers), haptic components (e.g., a vibratory motor), other signal generators, and so forth. The input components of the head-wearable apparatus 802, the user device 838, and server system 832, such as the user input device 806, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 802 may optionally include additional peripheral device elements. Such peripheral device elements may include biometric sensors, additional sensors, or display elements integrated with the head-wearable apparatus 802. For example, peripheral device elements may include any input/output (I/O) components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 836 from the user device 838 via the low power wireless circuitry 830 or high-speed wireless circuitry 824.

Any biometric data collected by biometric components is captured and stored only with user approval and deleted on user request. Further, such biometric data is used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Figure 9:
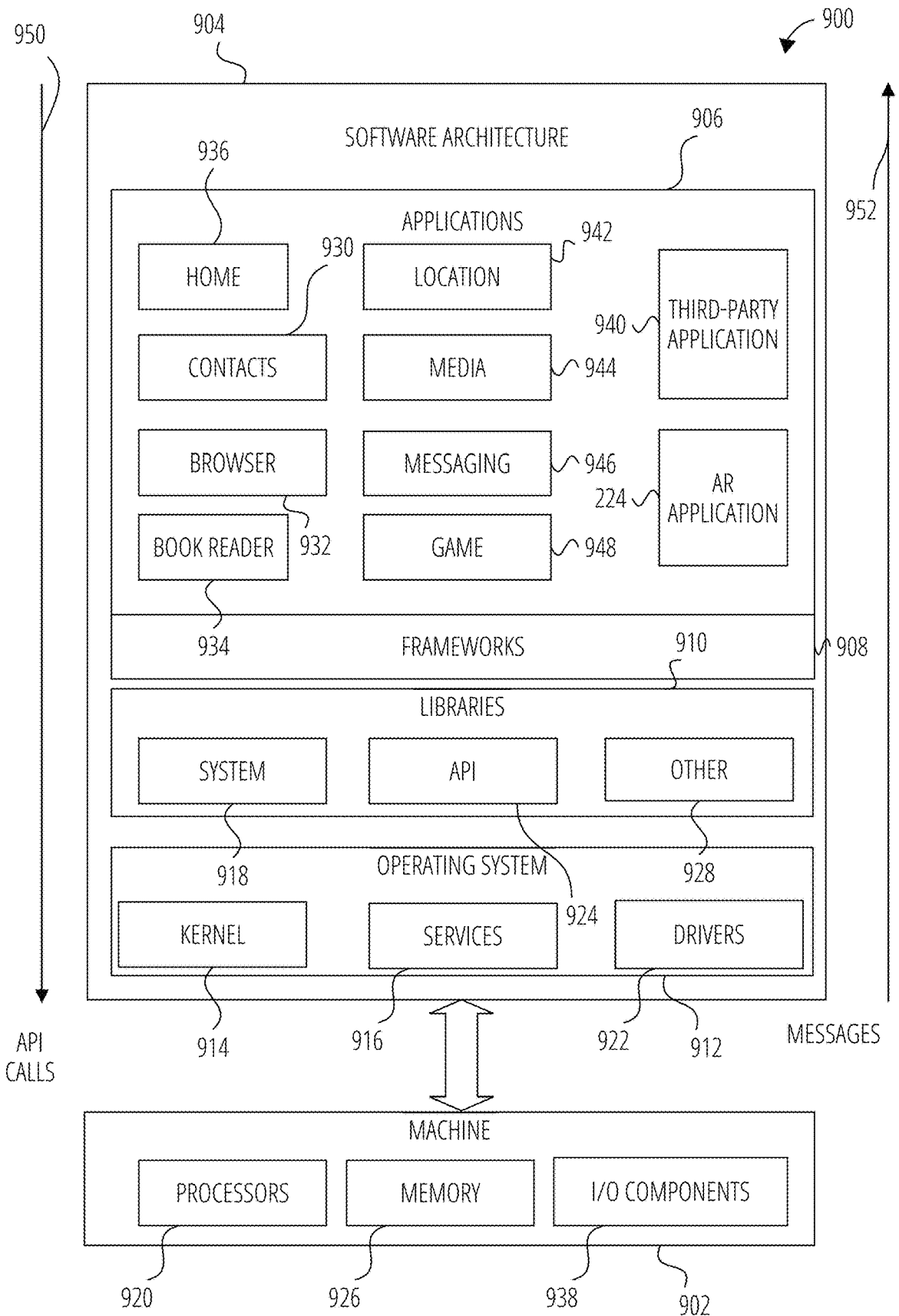
FIG. 9 is a block diagram showing a software architecture within which the present disclosure may be implemented, according to some examples.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke Application Programming Interface calls, API calls 950, through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 910 provide a low-level common infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a high-level common infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In some examples, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In some examples, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 9, the third-party application 940 can invoke the API calls 950 provided by the operating system 912 to facilitate functionality described herein. The applications 906 may include an AR application such as the AR application 224 described herein, according to some examples.

Figure 10:
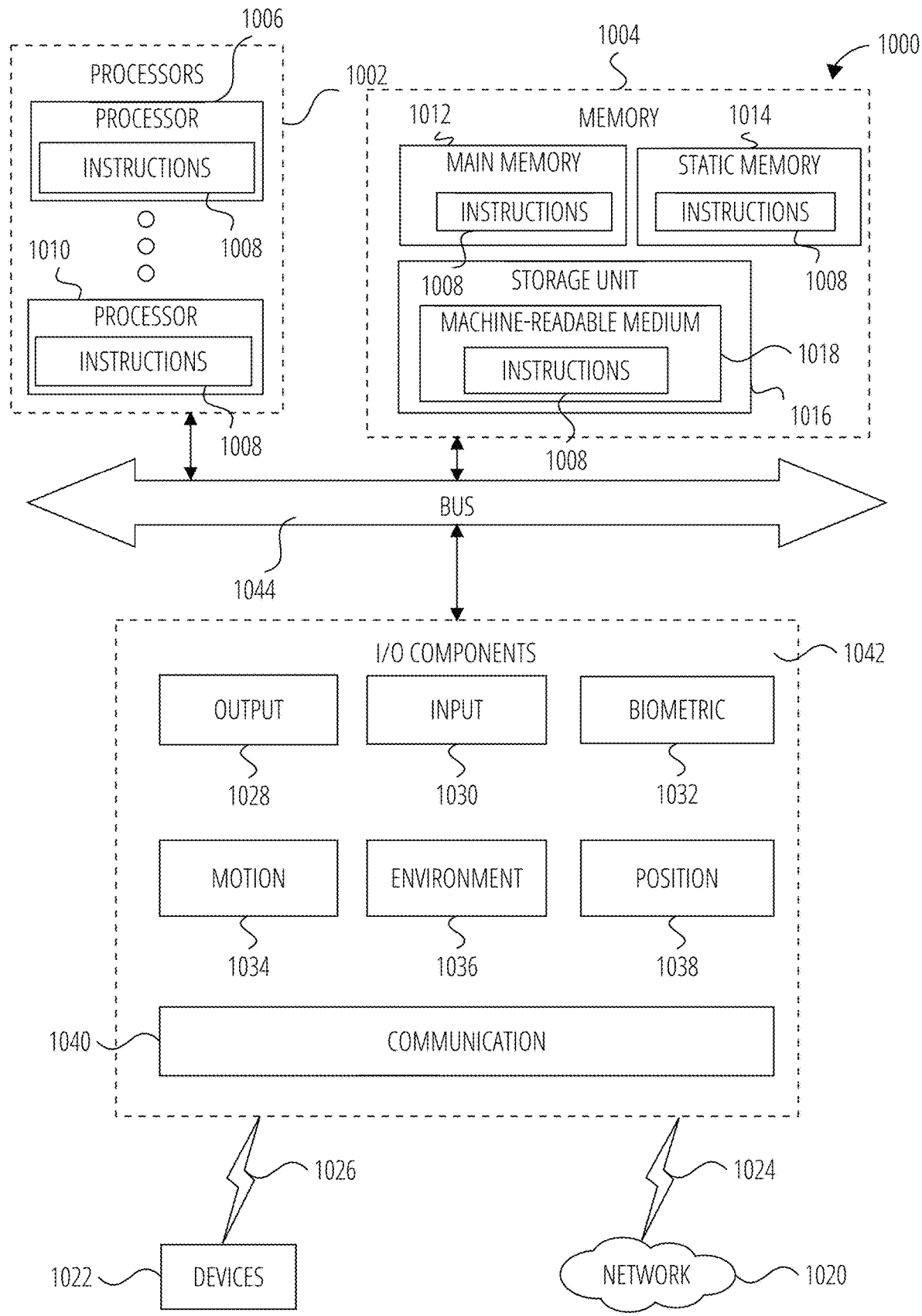
FIG. 10 is a diagrammatic representation of a machine in the form of a computer system within which a set of instructions may be executed for causing the machine to perform any one or more of the methodologies discussed herein, according to some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, VR device, a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In some examples, the processors 1002 may include, for example, a processor 1006 and a processor 1010 that execute the instructions 1008. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, accessible to the processors via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors, or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various examples, the I/O components 1042 may include output components 1028 and input components 1030. The output components 1028 may include visual components (e.g., a display such as a PDP, an LED display, a LCD, a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by biometric components is captured and stored only with user approval and deleted on user request. Further, such biometric data is used for very limited purposes, such as identification verification. To ensure limited and authorized use of biometric information and other PII, access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth™ components, Wi-Fi™ components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi™ signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a GPU, a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), an FPGA, a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, Very Long Instruction Word (VLIW), vector processing, or Single Instruction, Multiple Data (SIMD) that allow each core to run separate instruction streams concurrently. A processor may be emulated in software, running on a physical processor, as a virtual processor or virtual circuit. The virtual processor may behave like an independent processor but is implemented in software rather than hardware.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, as the following claims reflect, inventive subject matter lies in less than all features of a single disclosed example. Thus, the following claims are hereby incorporated into the Detailed Description.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method comprising: processing, by one or more processors, tracking data captured by one or more sensors associated with an XR device to determine positions of a plurality of joints of a hand of a person; generating, by the one or more processors, a reference vector based on a first subset of the positions, the first subset of the positions including positions of at least two MCP joints from among the plurality of joints; determining, by the one or more processors, a plurality of bending angles based on at least a second subset of the positions, each of the plurality of bending angles representing an angle between a respective pair of articulating bones, the angle being measured in relation to the reference vector; identifying, by the one or more processors, an estimated chirality of the hand based on the plurality of bending angles; and controlling, by the one or more processors, operation of the XR device using the estimated chirality of the hand.

In Example 2, the subject matter of Example 1 includes, wherein the XR device is a head-mounted XR device, and the person is a user of the XR device.

In Example 3, the subject matter of any of Examples 1-2 includes, wherein the reference vector comprises a line in three-dimensional space, and generating of the reference vector comprises automatically fitting the line to the first subset of the positions.

In Example 4, the subject matter of any of Examples 1-3 includes, wherein the at least two MCP joints include at least two of an index finger MCP joint, a middle finger MCP joint, a ring finger MCP joint, or a pinky finger MCP joint.

In Example 5, the subject matter of any of Examples 1-4 includes, wherein the at least two MCP joints comprise an index finger MCP joint and a middle finger MCP joint.

In Example 6, the subject matter of any of Examples 1-5 includes, wherein identifying of the estimated chirality comprises: determining an aggregated value representing the plurality of bending angles by computing at least one of an average of the plurality of bending angles, a median of the plurality of bending angles, or a sum of the plurality of bending angles, wherein the aggregated value is used to identify whether the hand is estimated to be a left hand or a right hand of the person.

In Example 7, the subject matter of any of Examples 1-6 includes, wherein the aggregated value indicates whether fingers of the hand are estimated to be bent in a positive direction or in a negative direction in relation to the reference vector.

In Example 8, the subject matter of any of Examples 1-7 includes, wherein each of the plurality of bending angles indicates whether a respective bone of the hand is estimated to be bent in a positive direction or in a negative direction in relation to the reference vector, and wherein identifying the estimated chirality comprises: determining that a ratio between bones estimated to be bent in the positive direction and bones estimated to be bent in the negative direction satisfies one or more predetermined criteria; and identifying whether the hand is estimated to be a left hand or a right hand of the person based on determining that the one or more predetermined criteria is satisfied.

In Example 9, the subject matter of any of Examples 1-8 includes, wherein the XR device is a head-mounted XR device, the person is a user of the XR device, and controlling the operation of the XR device using the estimated chirality comprises: in response to identifying the estimated chirality of the hand, selecting a content presentation format that matches the estimated chirality; and causing presentation, via the XR device, of virtual content to the user in the selected content presentation format.

In Example 10, the subject matter of any of Examples 1-9 includes, wherein the virtual content comprises one or more user interface elements for interacting with the XR device.

In Example 11, the subject matter of any of Examples 1-10 includes, wherein controlling the operation of the XR device using the estimated chirality comprises: in response to identifying the estimated chirality of the hand, using the estimated chirality to perform hand tracking during a user session on the XR device.

In Example 12, the subject matter of any of Examples 1-11 includes, wherein controlling the operation of the XR device using the estimated chirality comprises: in response to identifying the estimated chirality of the hand, using the estimated chirality to detect one or more hand gestures during a user session on the XR device.

In Example 13, the subject matter of any of Examples 1-12 includes, normalizing the reference vector, wherein each of the plurality of bending angles is measured around the normalized reference vector.

In Example 14, the subject matter of any of Examples 1-13 includes, wherein the estimated chirality of the hand is a second estimated chirality of the hand, the method further comprising: executing a machine learning model that processes at least some of the tracking data to generate a first estimated chirality of the hand without using the reference vector; comparing the first estimated chirality and the second estimated chirality; and using a result of the comparison of the first estimated chirality and the second estimated chirality to generate a final chirality estimate for the hand.

In Example 15, the subject matter of any of Examples 1-14 includes, wherein the plurality of joints includes joints of an index finger of the hand and joints of a middle finger of the hand.

In Example 16, the subject matter of any of Examples 1-15 includes, wherein the plurality of joints excludes joints of a thumb of the hand.

In Example 17, the subject matter of any of Examples 1-16 includes, wherein processing of the tracking data to determine the positions of the plurality of joints comprises executing a machine learning model that is trained to perform hand tracking.

In Example 18, the subject matter of any of Examples 1-17 includes, wherein the one or more sensors comprise at least one of: one or more optical sensors of the XR device, or one or more motion sensors attached to the hand.

Example 19 is an XR device comprising: at least one processor; and at least one memory storing instructions that, when executed by the at least one processor, cause the XR device to perform operations comprising: processing tracking data captured by one or more sensors associated with the XR device to determine positions of a plurality of joints of a hand of a person; generating a reference vector based on a first subset of the positions, the first subset of the positions including positions of at least two MCP joints from among the plurality of joints; determining a plurality of bending angles based on at least a second subset of the positions, each of the plurality of bending angles representing an angle between a respective pair of articulating bones, the angle being measured in relation to the reference vector; identifying an estimated chirality of the hand based on the plurality of bending angles; and controlling operation of the XR device using the estimated chirality of the hand.

Example 20 is a non-transitory computer-readable storage medium, the non-transitory computer-readable storage medium including instructions that when executed by at least one processor, cause the at least one processor to perform operations comprising: processing tracking data captured by one or more sensors associated with an XR device to determine positions of a plurality of joints of a hand of a person; generating a reference vector based on a first subset of the positions, the first subset of the positions including positions of at least two MCP joints from among the plurality of joints; determining a plurality of bending angles based on at least a second subset of the positions, each of the plurality of bending angles representing an angle between a respective pair of articulating bones, the angle being measured in relation to the reference vector; identifying an estimated chirality of the hand based on the plurality of bending angles; and controlling operation of the XR device using the estimated chirality of the hand.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method comprising:
    processing, by one or more processors, tracking data captured by one or more sensors associated with an extended reality (XR) device to determine positions of a plurality of joints of a hand of a person;
    generating, by the one or more processors, a reference vector based on a first subset of the positions, the first subset of the positions including positions of at least two metacarpophalangeal joints from among the plurality of joints;
    determining, by the one or more processors, a plurality of bending angles based on at least a second subset of the positions, each of the plurality of bending angles representing an angle between a respective pair of articulating bones, the angle being measured in relation to the reference vector;
    identifying, by the one or more processors, an estimated chirality of the hand based on the plurality of bending angles; and
    controlling, by the one or more processors, operation of the XR device using the estimated chirality of the hand.

2. The method of claim 1, wherein the XR device is a head-mounted XR device, and the person is a user of the XR device.

3. The method of claim 1, wherein the reference vector comprises a line in three-dimensional space, and generating of the reference vector comprises automatically fitting the line to the first subset of the positions.

4. The method of claim 1, wherein the at least two metacarpophalangeal joints include at least two of an index finger metacarpophalangeal joint, a middle finger metacarpophalangeal joint, a ring finger metacarpophalangeal joint, or a pinky finger metacarpophalangeal joint.

5. The method of claim 1, wherein the at least two metacarpophalangeal joints comprise an index finger metacarpophalangeal joint and a middle finger metacarpophalangeal joint.

6. The method of claim 1, wherein identifying of the estimated chirality comprises:
    determining an aggregated value representing the plurality of bending angles by computing at least one of an average of the plurality of bending angles, a median of the plurality of bending angles, or a sum of the plurality of bending angles, wherein the aggregated value is used to identify whether the hand is estimated to be a left hand or a right hand of the person.

7. The method of claim 6, wherein the aggregated value indicates whether segments of the hand are estimated to be bent in a positive direction or in a negative direction in relation to the reference vector.

8. The method of claim 1, wherein the plurality of bending angles indicate whether respective segments of the hand are estimated to be bent in a positive direction or in a negative direction in relation to the reference vector, and wherein identifying the estimated chirality comprises:
    determining that a ratio between segments estimated to be bent in the positive direction and segments estimated to be bent in the negative direction satisfies one or more predetermined criteria; and
    identifying whether the hand is estimated to be a left hand or a right hand of the person based on determining that the one or more predetermined criteria is satisfied.

9. The method of claim 1, wherein the XR device is a head-mounted XR device, the person is a user of the XR device, and controlling the operation of the XR device using the estimated chirality comprises:
    in response to identifying the estimated chirality of the hand, selecting a content presentation format that matches the estimated chirality; and
    causing presentation, via the XR device, of virtual content to the user in the selected content presentation format.

10. The method of claim 9, wherein the virtual content comprises one or more user interface elements for interacting with the XR device.

11. The method of claim 1, wherein controlling the operation of the XR device using the estimated chirality comprises:
in response to identifying the estimated chirality of the hand, using the estimated chirality to perform hand tracking during a user session on the XR device.

12. The method of claim 1, wherein controlling the operation of the XR device using the estimated chirality comprises:
in response to identifying the estimated chirality of the hand, using the estimated chirality to detect one or more hand gestures during a user session on the XR device.

13. The method of claim 1, further comprising:
normalizing the reference vector, wherein each of the plurality of bending angles is measured around the normalized reference vector.

14. The method of claim 1, wherein the estimated chirality of the hand is a second estimated chirality of the hand, the method further comprising:
executing a machine learning model that processes at least some of the tracking data to generate a first estimated chirality of the hand without using the reference vector;
comparing the first estimated chirality and the second estimated chirality; and
using a result of the comparison of the first estimated chirality and the second estimated chirality to generate a final chirality estimate for the hand.

15. The method of claim 1, wherein the plurality of joints include joints of an index finger of the hand and joints of a middle finger of the hand.

16. The method of claim 15, wherein the plurality of joints exclude joints of a thumb of the hand.

17. The method of claim 1, wherein processing of the tracking data to determine the positions of the plurality of joints comprises executing a machine learning model that is trained to perform hand tracking.

18. The method of claim 1, wherein the one or more sensors comprise at least one of: one or more optical sensors of the XR device, or one or more motion sensors attached to the hand.

19. An extended reality (XR) device comprising:
at least one processor; and
at least one memory storing instructions that, when executed by the at least one processor, cause the XR device to perform operations comprising:
processing tracking data captured by one or more sensors associated with the XR device to determine positions of a plurality of joints of a hand of a person;
generating a reference vector based on a first subset of the positions, the first subset of the positions including positions of at least two metacarpophalangeal joints from among the plurality of joints;
determining a plurality of bending angles based on at least a second subset of the positions, each of the plurality of bending angles representing an angle between a respective pair of articulating bones, the angle being measured in relation to the reference vector;
identifying an estimated chirality of the hand based on the plurality of bending angles; and
controlling operation of the XR device using the estimated chirality of the hand.

20. A non-transitory computer-readable storage medium, the non-transitory computer-readable storage medium including instructions that when executed by at least one processor, cause the at least one processor to perform operations comprising:
processing tracking data captured by one or more sensors associated with an extended reality (XR) device to determine positions of a plurality of joints of a hand of a person;
generating a reference vector based on a first subset of the positions, the first subset of the positions including positions of at least two metacarpophalangeal joints from among the plurality of joints;
determining a plurality of bending angles based on at least a second subset of the positions, each of the plurality of bending angles representing an angle between a respective pair of articulating bones, the angle being measured in relation to the reference vector;
identifying an estimated chirality of the hand based on the plurality of bending angles; and
controlling operation of the XR device using the estimated chirality of the hand.

* * * * *